US010129077B2

(12) United States Patent
Jain et al.

(10) Patent No.: US 10,129,077 B2
(45) Date of Patent: Nov. 13, 2018

(54) CONFIGURING AND OPERATING A XAAS MODEL IN A DATACENTER

(71) Applicant: Nicira, Inc., Palo Alto, CA (US)

(72) Inventors: Jayant Jain, Cupertino, CA (US); Anirban Sengupta, Saratoga, CA (US); Rick Lund, Livermore, CA (US); Raju Koganty, San Jose, CA (US); Xinhua Hong, Milpitas, CA (US); Mohan Parthasarathy, Cupertino, CA (US)

(73) Assignee: NICIRA, INC., Palo Alto, CA (US)

( * ) Notice: Subject to any disclaimer, the term of this patent is extended or adjusted under 35 U.S.C. 154(b) by 305 days.

(21) Appl. No.: 14/841,648

(22) Filed: Aug. 31, 2015

(65) Prior Publication Data
US 2016/0094633 A1    Mar. 31, 2016

Related U.S. Application Data

(60) Provisional application No. 62/058,044, filed on Sep. 30, 2014, provisional application No. 62/083,453, (Continued)

(51) Int. Cl.
G06F 15/16    (2006.01)
H04L 12/24    (2006.01)
(Continued)

(52) U.S. Cl.
CPC ........ H04L 41/0803 (2013.01); H04L 47/125 (2013.01); H04L 47/825 (2013.01);
(Continued)

(58) Field of Classification Search
CPC ... H04L 41/0803; H04L 47/825; H04L 51/18; H04L 67/1001; H04L 67/16; H04L 67/327; H04L 69/22; H04W 76/022
See application file for complete search history.

(56) References Cited

U.S. PATENT DOCUMENTS 6,104,700 A    8/2000    Haddock et al.
6,880,089 B1    4/2005    Bommareddy et al.
(Continued)

FOREIGN PATENT DOCUMENTS

JP    2005311863 A    11/2005
WO    9918534 A2    4/1999
(Continued)

OTHER PUBLICATIONS

International Search Report and Written Opinion of PCT/US2015/053332, dated Dec. 17, 2015, Nicira, Inc.
(Continued)

Primary Examiner — Nam T Tran
(74) Attorney, Agent, or Firm — Adeli LLP

(57) ABSTRACT

Some embodiments provide novel inline switches that distribute data messages from source compute nodes (SCNs) to different groups of destination service compute nodes (DSCNs). In some embodiments, the inline switches are deployed in the source compute nodes datapaths (e.g., egress datapath). The inline switches in some embodiments are service switches that (1) receive data messages from the SCNs, (2) identify service nodes in a service-node cluster for processing the data messages based on service policies that the switches implement, and (3) use tunnels to send the received data messages to their identified service nodes. Alternatively, or conjunctively, the inline service switches of some embodiments (1) identify service-nodes cluster for processing the data messages based on service policies that the switches implement, and (2) use tunnels to send the received data messages to the identified service-node clusters. The service-node clusters can perform the same service or can perform different services in some embodiments. This tunnel-based approach for distributing data messages to service nodes/clusters is advantageous for seamlessly imple-
(Continued)

menting in a datacenter a cloud-based XaaS model (where XaaS stands for X as a service, and X stands for anything), in which any number of services are provided by service providers in the cloud.

23 Claims, 18 Drawing Sheets

Related U.S. Application Data filed on Nov. 24, 2014, provisional application No. 62/086,136, filed on Dec. 1, 2014, provisional application No. 62/142,876, filed on Apr. 3, 2015.

(51) Int. Cl.
| | |
|---|---|
| H04L 29/06 | (2006.01) |
| H04L 12/803 | (2013.01) |
| H04L 29/08 | (2006.01) |
| H04L 12/911 | (2013.01) |
| H04L 12/58 | (2006.01) |
| H04W 76/12 | (2018.01) |

(52) U.S. Cl.
CPC ............ H04L 51/18 (2013.01); H04L 67/10 (2013.01); H04L 67/1002 (2013.01); H04L 67/14 (2013.01); H04L 67/16 (2013.01); H04L 67/327 (2013.01); H04L 69/16 (2013.01); H04L 69/22 (2013.01); H04W 76/12 (2018.02)

(56) References Cited

U.S. PATENT DOCUMENTS

| | | |
|---|---|---|
| 6,985,956 B2 | 1/2006 | Luke et al. |
| 7,013,389 B1 | 3/2006 | Srivastava et al. |
| 7,480,737 B2 | 1/2009 | Chauffour et al. |
| 7,818,452 B2 | 10/2010 | Matthews et al. |
| 7,898,959 B1 | 3/2011 | Arad |
| 7,948,986 B1 | 5/2011 | Ghosh et al. |
| 8,078,903 B1 | 12/2011 | Parthasarathy et al. |
| 8,175,863 B1 | 5/2012 | Ostermeyer et al. |
| 8,190,767 B1 | 5/2012 | Maufer et al. |
| 8,266,261 B2 | 9/2012 | Akagi |
| 8,521,879 B1 | 8/2013 | Pena et al. |
| 8,849,746 B2 | 9/2014 | Candea et al. |
| 8,873,399 B2 | 10/2014 | Bothos et al. |
| 8,914,406 B1 | 12/2014 | Haugsnes et al. |
| 9,104,497 B2 | 8/2015 | Mortazavi |
| 9,148,367 B2 | 9/2015 | Kandaswamy et al. |
| 9,191,293 B2 | 11/2015 | Iovene et al. |
| 9,232,342 B2 * | 1/2016 | Seed .................... H04L 47/825 |
| 9,264,313 B1 | 2/2016 | Manuguri et al. |
| 9,277,412 B2 | 3/2016 | Freda et al. |
| 9,397,946 B1 | 7/2016 | Vadav |
| 9,503,530 B1 * | 11/2016 | Niedzielski ............ H04L 67/16 |
| 9,755,971 B2 | 9/2017 | Wang et al. |
| 9,774,537 B2 | 9/2017 | Jain et al. |
| 2002/0097724 A1 | 7/2002 | Halme et al. |
| 2003/0093481 A1 | 5/2003 | Mitchell et al. |
| 2003/0105812 A1 | 6/2003 | Flowers, Jr. et al. |
| 2004/0210670 A1 | 10/2004 | Anerousis et al. |
| 2005/0091396 A1 | 4/2005 | Milakantan et al. |
| 2005/0114429 A1 | 5/2005 | Caccavale |
| 2005/0132030 A1 | 6/2005 | Hopen et al. |
| 2005/0249199 A1 | 11/2005 | Albert et al. |
| 2006/0069776 A1 | 3/2006 | Shim et al. |
| 2006/0130133 A1 | 6/2006 | Andreev et al. |
| 2006/0155862 A1 | 7/2006 | Kathi et al. |
| 2006/0233155 A1 | 10/2006 | Srivastava |
| 2007/0061492 A1 | 3/2007 | Van Riel |
| 2007/0214282 A1 | 9/2007 | Sen |
| 2008/0005293 A1 | 1/2008 | Bhargava et al. |
| 2008/0031263 A1 | 2/2008 | Ervin et al. |
| 2008/0046400 A1 | 2/2008 | Shi et al. |
| 2008/0049614 A1 | 2/2008 | Briscoe et al. |
| 2008/0049786 A1 | 2/2008 | Ram et al. |
| 2008/0072305 A1 | 3/2008 | Casado et al. |
| 2008/0084819 A1 | 4/2008 | Parizhsky et al. |
| 2008/0104608 A1 | 5/2008 | Hyser et al. |
| 2008/0195755 A1 | 8/2008 | Lu et al. |
| 2008/0225714 A1 | 9/2008 | Denis |
| 2008/0239991 A1 | 10/2008 | Applegate et al. |
| 2008/0247396 A1 | 10/2008 | Hazard |
| 2008/0279196 A1 | 11/2008 | Friskney et al. |
| 2009/0063706 A1 | 3/2009 | Goldman et al. |
| 2009/0129271 A1 | 5/2009 | Ramankutty et al. |
| 2009/0172666 A1 | 7/2009 | Yahalom et al. |
| 2009/0235325 A1 | 9/2009 | Dimitrakos et al. |
| 2009/0265467 A1 | 10/2009 | Peles |
| 2009/0299791 A1 | 12/2009 | Blake et al. |
| 2009/0300210 A1 | 12/2009 | Ferris |
| 2009/0303880 A1 | 12/2009 | Maltz et al. |
| 2009/0307334 A1 | 12/2009 | Maltz et al. |
| 2009/0327464 A1 | 12/2009 | Archer et al. |
| 2010/0031360 A1 | 2/2010 | Seshadri et al. |
| 2010/0036903 A1 | 2/2010 | Ahmad et al. |
| 2010/0131638 A1 | 5/2010 | Kondamuru |
| 2010/0223364 A1 | 9/2010 | Wei |
| 2010/0223621 A1 | 9/2010 | Joshi et al. |
| 2010/0265824 A1 | 10/2010 | Chao et al. |
| 2011/0010578 A1 | 1/2011 | Dominguez et al. |
| 2011/0016348 A1 | 1/2011 | Pace et al. |
| 2011/0022695 A1 | 1/2011 | Dalai et al. |
| 2011/0022812 A1 | 1/2011 | Van der Linden et al. |
| 2011/0040893 A1 | 2/2011 | Karaoguz et al. |
| 2011/0055845 A1 | 3/2011 | Nandagopal et al. |
| 2011/0090912 A1 | 4/2011 | Shippy |
| 2011/0164504 A1 | 7/2011 | Bothos et al. |
| 2011/0211463 A1 | 9/2011 | Matityahu et al. |
| 2011/0225293 A1 | 9/2011 | Rathod |
| 2011/0235508 A1 | 9/2011 | Goel et al. |
| 2011/0261811 A1 | 10/2011 | Battestilli et al. |
| 2011/0268118 A1 | 11/2011 | Schlansker et al. |
| 2011/0283013 A1 | 11/2011 | Grosser et al. |
| 2011/0295991 A1 | 12/2011 | Aida |
| 2012/0014386 A1 | 1/2012 | Xiong et al. |
| 2012/0023231 A1 | 1/2012 | Ueno |
| 2012/0054266 A1 | 3/2012 | Kazerani et al. |
| 2012/0089664 A1 | 4/2012 | Igelka |
| 2012/0137004 A1 | 5/2012 | Smith |
| 2012/0144014 A1 | 6/2012 | Natham et al. |
| 2012/0147894 A1 | 6/2012 | Mulligan et al. |
| 2012/0155266 A1 | 6/2012 | Patel et al. |
| 2012/0185588 A1 | 7/2012 | Error |
| 2012/0207174 A1 | 8/2012 | Shieh |
| 2012/0230187 A1 | 9/2012 | Tremblay et al. |
| 2012/0246637 A1 | 9/2012 | Kreeger et al. |
| 2012/0287789 A1 | 11/2012 | Aybay et al. |
| 2012/0303809 A1 | 11/2012 | Patel et al. |
| 2012/0331188 A1 | 12/2012 | Riordan et al. |
| 2013/0003735 A1 | 1/2013 | Chao et al. |
| 2013/0044636 A1 | 2/2013 | Koponen et al. |
| 2013/0073743 A1 | 3/2013 | Ramasamy et al. |
| 2013/0136126 A1 | 5/2013 | Wang |
| 2013/0148505 A1 | 6/2013 | Koponen et al. |
| 2013/0160024 A1 | 6/2013 | Shtilman et al. |
| 2013/0163594 A1 | 6/2013 | Sharma et al. |
| 2013/0201989 A1 | 8/2013 | Hu et al. |
| 2013/0227097 A1 | 8/2013 | Yasuda et al. |
| 2013/0227550 A1 | 8/2013 | Weinstein et al. |
| 2013/0332983 A1 | 12/2013 | Koorevaar et al. |
| 2014/0059204 A1 | 2/2014 | Nguyen et al. |
| 2014/0059544 A1 | 2/2014 | Koganty et al. |
| 2014/0068602 A1 | 3/2014 | Gember et al. |
| 2014/0092738 A1 | 4/2014 | Grandhi et al. |
| 2014/0101226 A1 | 4/2014 | Khandekar et al. |
| 2014/0115578 A1 | 4/2014 | Cooper et al. |
| 2014/0129715 A1 | 5/2014 | Mortazavi |
| 2014/0164477 A1 | 6/2014 | Springer et al. |
| 2014/0169168 A1 | 6/2014 | Jalan et al. |
| 2014/0195666 A1 | 7/2014 | Dumitriu et al. |

(56) References Cited

U.S. PATENT DOCUMENTS

| | | |
|---|---|---|
| 2014/0207968 A1 | 7/2014 | Kumar et al. |
| 2014/0254374 A1 | 9/2014 | Janakiraman et al. |
| 2014/0281029 A1 | 9/2014 | Danforth |
| 2014/0282526 A1 | 9/2014 | Basavaiah et al. |
| 2014/0301388 A1 | 10/2014 | Jagadish et al. |
| 2014/0304231 A1 | 10/2014 | Kamath et al. |
| 2014/0310391 A1 | 10/2014 | Sorenson, III |
| 2014/0310418 A1 | 10/2014 | Sorenson, III |
| 2014/0330983 A1 | 11/2014 | Zisapel et al. |
| 2014/0362705 A1 | 12/2014 | Pan |
| 2014/0369204 A1 | 12/2014 | Anand et al. |
| 2014/0372567 A1 | 12/2014 | Ganesh et al. |
| 2014/0372616 A1 | 12/2014 | Arisoylu et al. |
| 2014/0372702 A1 | 12/2014 | Subramanyam et al. |
| 2015/0003453 A1 | 1/2015 | Sengupta et al. |
| 2015/0003455 A1* | 1/2015 | Haddad .................. H04L 45/38 370/392 |
| 2015/0026345 A1 | 1/2015 | Ravinoothala et al. |
| 2015/0030024 A1 | 1/2015 | Venkataswami et al. |
| 2015/0052262 A1 | 2/2015 | Chanda et al. |
| 2015/0063364 A1 | 3/2015 | Thakkar et al. |
| 2015/0213087 A1 | 7/2015 | Sikri |
| 2015/0215819 A1 | 7/2015 | Bosch et al. |
| 2015/0280959 A1 | 10/2015 | Vincent |
| 2015/0281089 A1 | 10/2015 | Marchetti |
| 2015/0288679 A1 | 10/2015 | Ben-Nun et al. |
| 2015/0372911 A1 | 12/2015 | Yabusaki et al. |
| 2016/0043901 A1 | 2/2016 | Sankar et al. |
| 2016/0094384 A1 | 3/2016 | Jain et al. |
| 2016/0094451 A1 | 3/2016 | Jain et al. |
| 2016/0094452 A1 | 3/2016 | Jain et al. |
| 2016/0094457 A1 | 3/2016 | Jain et al. |
| 2016/0094631 A1 | 3/2016 | Jain et al. |
| 2016/0094632 A1 | 3/2016 | Jain et al. |
| 2016/0094642 A1 | 3/2016 | Jain et al. |
| 2016/0094661 A1 | 3/2016 | Jain et al. |
| 2016/0149816 A1 | 5/2016 | Wu et al. |
| 2016/0164787 A1 | 6/2016 | Roach et al. |
| 2017/0142012 A1 | 5/2017 | Thakkar et al. |

FOREIGN PATENT DOCUMENTS

| | | |
|---|---|---|
| WO | 2008095010 A1 | 8/2008 |
| WO | PCT/US2014/072897 | 12/2014 |
| WO | PCT/US2015/053332 | 9/2015 |
| WO | 2016053373 A1 | 4/2016 |
| WO | 2016054272 A1 | 4/2016 |

OTHER PUBLICATIONS

Invitation to Pay Additional Fees of PCT/US2014/072897, dated May 29, 2015, Nicira, Inc.

International Search Report and Written Opinion of PCT/US2014/072897, dated Aug. 4, 2015, Nicira, Inc.

Author Unknown, "Enabling Service Chaining on Cisco Nexus 1000V Series," Month Unknown, 2012, 25 pages, Cisco.

Author Unknown. "AppLogic Features," Jul. 2007, 2 pages, 3TERA Inc.

Dixon, Colin, et al., "An End to the Middle," Proceedings of the 12th Conference on Hot Topics in Operating Systems USENIX Association, May 2009, 5 pages, Berkeley, CA, USA.

Dumitriu, Dan Mihai, et al., (U.S. Appl. No. 61/514,990), filed Aug. 4, 2011, 31 pages.

Greenberg, Albert, et al., "VL2: A Scalable and Flexible Data Center Network," SIGCOMM '09, Aug. 17-21, 2009, 12 pages, ACM, Barcelona, Spain.

Guichard, J., et al., "Network Service Chaining Problem Statement," Network Working Group, Jun. 13, 2013, 14 pages, Cisco Systems, Inc.

Joseph, Dilip Anthony, et al., "A Policy-aware Switching Layer for Data Centers," Jun. 24, 2008, 26 pages, Electrical Engineering and Computer Sciences, University of California, Berkeley, CA, USA.

Sekar, Vyas, et al., "Design and Implementation of a Consolidated Middlebox Architecture," 9th USENIX conference on Networked System Design and Implementation, Apr. 25-27, 2012, 14 pages.

Sherry, Justine, et al., "Making Middleboxes Someone Else's Problem: Network Processing as a Cloud Service," SIGCOMM '12, Aug. 13-17, 2012, 12 pages, ACM, Helsinki, Finland.

* cited by examiner

CONFIGURING AND OPERATING A XAAS MODEL IN A DATACENTER

BACKGROUND

Datacenters today use a very static, configuration intensive way to distribute data messages between different application layers and to different service layers. A common approach today is to configure the virtual machines to send packets to virtual IP addresses, and then configure the forwarding elements and load balancers in the datacenter with forwarding rules that direct them to forward VIP addressed packets to appropriate application and/or service layers. Another problem with existing message distribution schemes is that today's load balancers often are chokepoints for the distributed traffic. Accordingly, there is a need in the art for a new approach to seamlessly distribute data messages in the datacenter between different application and/or service layers. Ideally, this new approach would allow the distribution scheme to be easily modified without reconfiguring the servers that transmit the data messages.

BRIEF SUMMARY

Some embodiments provide novel inline switches that distribute data messages from source compute nodes (SCNs) to different groups of destination service compute nodes (DSCNs). In some embodiments, the inline switches are deployed in the source compute nodes datapaths (e.g., egress datapath). The inline switches in some embodiments are service switches that (1) receive data messages from the SCNs, (2) identify service nodes in a service-node cluster for processing the data messages based on service policies that the switches implement, and (3) use tunnels to send the received data messages to their identified service nodes.

Alternatively, or conjunctively, the inline service switches of some embodiments (1) identify service-nodes cluster for processing the data messages based on service policies that the switches implement, and (2) use tunnels to send the received data messages to the identified service-node clusters. The service-node clusters can perform the same service or can perform different services in some embodiments. This tunnel-based approach for distributing data messages to service nodes/clusters is advantageous for seamlessly implementing in a datacenter a cloud-based XaaS model (where XaaS stands for X as a service, and X stands for anything), in which any number of services are provided by service providers in the cloud.

In some embodiments, an inline service switch performs load-balancing operations to distribute data messages among several service nodes or service-node clusters that perform the same service. Alternatively, or conjunctively, a service cluster in some embodiments can have one or more load balancers that distribute data messages received for the cluster among the service nodes of the service cluster.

In some embodiments, at least one service cluster implements an elastic model in which one primary service node receives the cluster's data messages from the inline service switches. This service node then either performs the service on the data message itself or directs the data message (e.g., through L3 and/or L4 network address translation, through MAC redirect, etc.) to one of the other service nodes (called secondary service nodes) in the cluster to perform the service on the data message. The primary service node in some embodiments elastically shrinks or grows the number of secondary service nodes in the cluster based on the received data message load.

Some embodiments provide an inline load-balancing switch that statefully distributes the service load to a number of service nodes based on one or more L4+ parameters, which are packet header parameters that are above L1-L4 parameters. Examples of L4+ parameters include session keys, session cookies (e.g., SSL session identifiers), file names, database server attributes (e.g., user name), etc. To statefully distribute the service load among server nodes, the inline load-balancing switch in some embodiments establishes layer 4 connection sessions (e.g., a TCP/IP sessions) with the data-message SCNs and the service nodes, so that the switch (1) can monitor one or more of the initial payload packets that are exchanged for the session, and (2) can extract and store the L4+ session parameters for later use in its subsequent load balancing operation.

In some embodiments, the inline switch establishes layer 4 connection session with a SCN and another session with a service node by performing a three-way TCP handshake with the SCN and another one with the service node. To relay data messages between the SCN and the service node, the inline switch in some embodiments can adjust the sequence numbers of the relayed data messages to address differences in sequence numbers between the SCN and the service node.

Some embodiments provide a controller-driven method for reconfiguring the application or service layer deployment in a datacenter. In some embodiments, one or more controllers define data-message distribution policies for SCNs in the datacenter, and push these policies, or rules based on these policies, to the inline switches of the SCNs. The inline switches then distribute the data messages to the data compute nodes (DCNs) that are identified by the distribution policies/rules as the DCNs for the data messages. In some embodiments, a distribution policy or rule is expressed in terms of a DCN group address (e.g., a virtual IP address (VIP)) that the SCNs use to address several DCNs that are in a DCN group.

This controller-driven method can seamlessly reconfigure the application or service layer deployment in the datacenter without having to configure the SCNs to use new DCN group addresses (e.g., new VIPs). The controller set only needs to provide the inline switches with new distribution policies or rules that dictate new traffic distribution patterns based on previously configured DCN group addresses. In some embodiments, the seamless reconfiguration can be based on arbitrary packet header parameters (e.g., L2, L3, L4 or L7 parameters) that are used by the SCNs. In other words, these packet header parameters in some cases would not have to include DCN group addresses. In some embodiments, the inline switches can be configured to distribute data messages based on metadata tags that are associated with the packets, and injected into the packets (e.g., as L7 parameters) by application level gateways (ALGs). For example, as ALGs are configured to inspect and tag packets as the packets enter a network domain (e.g., a logical domain), the controller set in some embodiments is configured to push new distribution policies and/or rules to the inline switches that configure these switches to implement new application or service layer deployment in the network domain.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
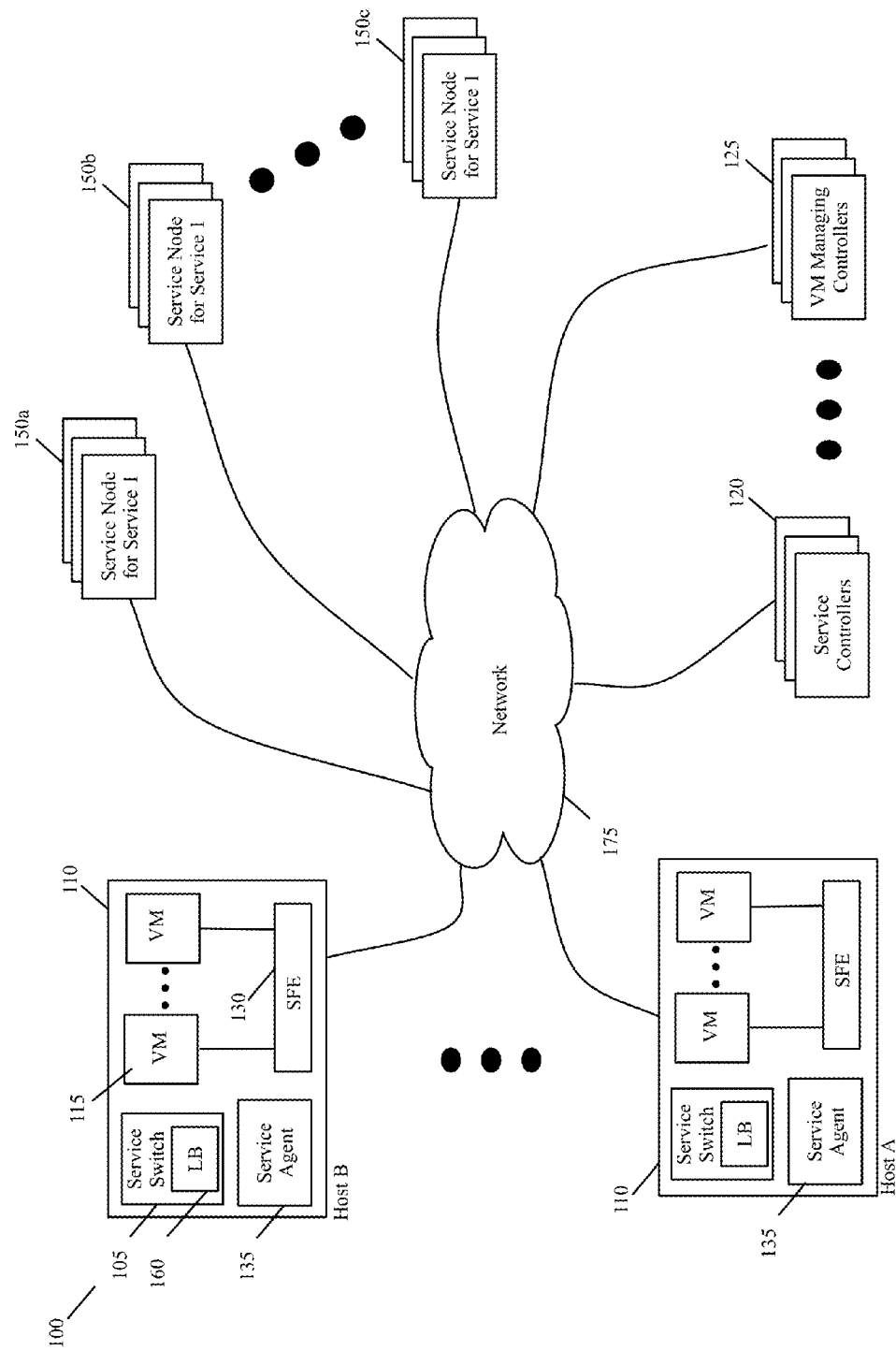
FIG. 1 illustrates an example of a multi-host system with the inline service switches.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide novel inline switches that distribute data messages from source compute nodes (SCNs) to different groups of destination service compute nodes (DSCNs). In some embodiments, the inline switches are deployed in the source compute nodes datapaths (e.g., egress datapaths). The inline switches in some embodiments are service switches that (1) receive data messages from the SCNs, (2) identify service nodes in a service-node cluster for processing the data messages based on service policies that the switches implement, and (3) use tunnels to send the received data messages to their identified service nodes.

Alternatively, or conjunctively, the inline service switches of some embodiments (1) identify service-nodes clusters for processing the data messages based on service policies that the switches implement, and (2) use tunnels to send the received data messages to the identified service-node clusters. The service-node clusters can perform the same service or can perform different services in some embodiments. This tunnel-based approach for distributing data messages to service nodes/clusters is advantageous for seamlessly implementing in a datacenter a cloud-based XaaS model (where XaaS stands for X as a service, and X stands for anything), in which any number of services are provided by service providers in the cloud.

A tunnel uses a tunnel header to encapsulate the packets from one type of protocol in the datagram of a different protocol. For example, VPN (virtual private network) tunnels use PPTP (point-to-point tunneling protocol) to encapsulate IP (Internet Protocol) packets over a public network, such as the Internet. GRE (generic routing encapsulation) tunnels use GRE headers to encapsulate a wide variety of network layer protocols inside virtual point-to-point links over an IP network. In other words, a GRE tunnel encapsulates a payload inside an outer IP packet.

As used in this document, cloud refers to one or more sets of computers in one or more datacenters that are accessible through a network (e.g., through the Internet). In some embodiments, the XaaS model is implemented by one or more service providers that operate in the same datacenter or in different datacenters in different locations (e.g., different neighborhoods, cities, states, countries, etc.).

Also, as used in this document, a data message refers to a collection of bits in a particular format sent across a network. One of ordinary skill in the art will recognize that the term data message may be used herein to refer to various formatted collections of bits that may be sent across a network, such as Ethernet frames, IP packets, TCP segments, UDP datagrams, etc. Also, as used in this document, references to L2, L3, L4, and L7 layers are references respectively to the second data link layer, the third network layer, the fourth transport layer, and the seventh application layer of the OSI (Open System Interconnection) layer model.

In some embodiments, an inline service switch (ISS) performs load balancing operations to distribute data messages among several service nodes or service node clusters that perform the same service. Alternatively, or conjunctively, a service cluster in some embodiments can have one or more load balancers that distribute data messages received for the cluster among the service nodes of the service cluster.

In some embodiments, at least one service cluster implements an elastic model in which one primary service node receives the cluster's data messages from the inline service switches. This service node then either performs the service on the data message itself or directs the data message (e.g., through L3 and/or L4 network address translation, through MAC redirect, etc.) to one of the other service nodes (called secondary service nodes) in the cluster to perform the service on the data message. The primary service node in some embodiments elastically shrinks or grows the number of secondary service nodes in the cluster based on the received data message load.

In some embodiments, an SCN can be a virtual machine (VM) or software container (such as a Docker container) that executes on a host along with other VMs or containers that serve as SCNs or destination compute nodes (DCNs). Examples of DCNs in some embodiments include compute end nodes that generate or consume data messages, or middlebox service nodes that perform some type of data processing on the data messages as these messages are being relayed between the data compute end nodes. Examples of data compute end nodes include webservers, application servers, database servers, etc., while example of middlebox service nodes include firewalls, intrusion detection systems, intrusion prevention systems, etc.

A service node is a standalone appliance or is a DCN (e.g., a VM, container, or module) that executes on a host computer. The service nodes can be data compute end nodes (e.g., webservers, application servers, database servers, etc.), or can be middlebox service nodes (e.g., firewalls, intrusion detection systems, intrusion prevention systems, etc.).

In some embodiments, the inline service switch is another software module that executes on the same host as the SCN. Two or more of the SCNs on the host use the same inline service switch in some embodiments, while in other embodiments, each SCN on the host has its own inline service switch that executes on the host. The host also executes a software forwarding element (SFE) in some embodiments. The SFE communicatively couples the SCNs of the host to each other and to other devices (e.g., other SCNs) outside of the host. In some embodiments, the inline switches are inserted in the egress path of the SCNs before the SFE.

In some embodiments, one or more controllers configure the inline service switches by providing the service distribution policies or by providing distribution rules that are defined based on the service distribution policies. One example of these controllers are the ISS controllers 120 of FIG. 1. This figure illustrates an example of a multi-host system 100 with the inline service switches 105 of some embodiments. This system includes multiple host computing devices 110, a set of ISS controllers 120, a set of one or more VM managing controllers 125, and multiple service node clusters 150. As shown in FIG. 1, the hosts 110, the ISS controller set 120, the VM manager set 125, and the service node clusters 150 communicatively couple through a network 175, which can include a local area network (LAN), a wide area network (WAN) or a network of networks (e.g., Internet).

Each host computing device 110 (e.g., computer) executes one or more VMs 115, one or more SFEs 130 (e.g., a software switch, a software router, etc.), an ISS agent 135, and one or more inline service switches 105. The VMs include SCNs and DCNs in some embodiments. In some embodiments, an SFE 130 on a host communicatively couples the VMs of the host to each other and to devices outside of the host (e.g., to VMs of other hosts). Also, in some embodiments, an SFE of a host implements one or more logical networks with the SFEs executing on other hosts. The SFE 130 also communicatively couples an ISS 105 on the host to one or more service nodes or one or more service node clusters 150.

In some embodiments, each ISS 105 is associated with one VM on its host, while in other embodiments, one ISS 105 is associated with more than one VM on its host (e.g., is associated with all VMs on its host that are part of one logical network). For the data messages that are sent by its associated VM, an ISS 105 enforces one or more service rules that implement one or more service policies. Based on the service rules, the ISS (1) determines whether a sent data message should be processed by one or more service nodes or clusters, and (2) if so, selects a service node or cluster for processing the data message and forwards the data message to the selected node or cluster through a tunnel.

Each ISS 105 has a load balancer 160 that it uses to determine how to distribute the load for performing a service to one or more service nodes or one or more service node clusters that perform this service. In some embodiments, an ISS 105 connects to a service node or cluster through a tunnel. In other embodiments, the inline switches connect to some service nodes/clusters through tunnels, while not using tunnels to connect to other service nodes/clusters. In some embodiments, the service nodes are in different datacenters than the hosts 110 and controllers 120 and 125, while in other embodiments one or more of the service nodes are in the same datacenter as the hosts 110 and controllers 120 and 125. In some embodiments, some of the service nodes are service VMs that execute on hosts 110.

Also, in some embodiments, different service node clusters can provide the same service or can provide different services. For instance, in the example illustrated in FIG. 1, the service node clusters 150a and 150b provide the same service (e.g., firewall service), while the service node cluster 150c provides a difference service (e.g., intrusion detection). The tunnel-based approach for distributing data messages to service nodes/clusters in the same datacenter or different datacenters is advantageous for seamlessly implementing a cloud-based XaaS model, in which any number of services are provided by service providers in the cloud.

This tunnel-based, XaaS model architecture allows hosts 110 and VMs 115 in a private datacenter (e.g., in an enterprise datacenter) to seamlessly use one or more service clusters that are in one or more public multi-tenant datacenters in one or more locations. The private datacenter typically connects to a public datacenter through a public network, such as the Internet. Examples of cloud service providers include: firewall-service providers, email spam service providers, intrusion detection service providers, data compression service providers, etc. One provider can provide multiple cloud services (e.g., firewall, intrusion detection, etc.), while another provider can provide only one service (e.g., data compression).

In some embodiments, the ISS for a VM is deployed in the VM's egress datapath. For instance, in some embodiments, each VM has a virtual network interface card (VNIC) that connects to a port of the SFE. In some of these embodiments, the inline switch for a VM is called by the VM's VNIC or by the SFE port to which the VM's VNIC connects. In some embodiments, the VMs execute on top of a hypervisor, which is a software layer that enables the virtualization of the shared hardware resources of the host. In some of these embodiments, the hypervisor provides the inline switches that provide the inline switching and load balancing service to its VMs.

Multiple inline service switches that execute on multiple hosts can implement a distributed service switch. In a distributed service switch, the data messages from one group of related VMs on multiple different hosts get distributed to one or more service nodes or clusters according to the same service distribution policies. These data messages are distributed according to the same service distribution policies because the individual inline service switches for the SCN group are configured with the same policies or rules.

The VM managing controllers 125 provide control and management functionality for defining (e.g., allocating or instantiating) and managing one or more VMs on each host. The ISS controller set 120 configures the inline switches 105 and their associated load balancers 160 through the ISS agent 135. In some embodiments, one of these two controller sets 120 and 125 provide control and management functionality for defining and managing multiple logical networks that are defined on the common SFE physical infrastructure of the hosts. The controllers 120 and 125 communicate with their agents that execute on the hosts through out-of-band control channel communication in some embodiments. In some embodiments, controllers 120 and 125 are standalone servers or are servers executing on host machines along with other servers.

In some embodiments, the ISS controller set 120 provides the ISS agent with high level service policies that the ISS agent converts into service rules for the inline switches to implement. These service policies and rules include load balancing policies and rules that the load balancers of the inline switches implement. In some embodiments, the ISS controller set provides the ISS agent with service rules that the agent passes along to the inline switches and load balancers. In still other embodiments, the ISS controller set provides both service policies and service rules to the ISS agent. In these embodiments, the ISS agent converts the service policies to service rules, and then it provides the received and converted service rules to the inline switches and load balancers. In yet other embodiments, the ISS controller set directly configures the inline switches and load balancers without going through an ISS agent.

In some embodiments, the ISS controller set also provides to the ISS agents 135, service switches 105 or their load balancers 160, load balancing criteria that the load balancers use to perform their load balancing operations. For example, the load balancing criteria includes a set of weight values that specify how the load balancers should distribute the data message load among a set of service nodes in a weighted round robin approach. In some embodiments, the ISS controller set 120 distributes data-message load statistics and the service agents 135, ISS 105 or the load balancers 160 generate load balancing criteria based on these statistics.

More specifically, in some embodiments, the ISS controller set 120 gathers statistics from inline switches and based on the gathered statistics, dynamically adjusts the service policies, service rules and/or load balancing criteria that it distributes directly or indirectly (through the ISS agent) to the inline switches and load balancers. In some embodiment, each inline switch stores statistics regarding its data message distribution in a data storage (called STAT storage below) that it updates on its host. The ISS agent 135 periodically gathers the collected statistics from the STAT data storage (not shown in FIG. 1), and relays these statistics to the ISS controller set 120. In some embodiments, the agent 135 aggregate and/or analyze some of the statistics before relaying processed statistics to the ISS controller set 120, while in other embodiments the agents relay collected raw statistics to the ISS controller set 120.

The ISS controller set 120 of some embodiments aggregates the statistics that it receives from the agents of the hosts. In some embodiments, the ISS controller set 120 then distributes the aggregated statistics to the agents that execute on the hosts. These agents then analyze the aggregated statistics to generate and/or to adjust rules or criteria that their associated inline switches or their load balancers enforce. In other embodiments, the controller set analyzes the aggregated statistics to generate and/or to adjust service policies, service rules and/or LB criteria, which the controller set then distributes to the agents 135 of the hosts for their inline switches and load balancers to enforce.

In some of these embodiments, the controller set distributes the same policies, rules and/or criteria to each ISS in a group of associated ISS, while in other embodiments, the controller set distributes different policies, rules and/or criteria to different ISS in a group of associated ISS. In some embodiments, the controller set distributes updated policies, rules and/or criteria to some of the inline switches in an associated group of switches, while not distributing the updated policies, rules and/or criteria to other inline switches in the associated group. In some embodiments, the controller set updates and distributes some policies, rules or criteria based on the aggregated statistics, while also distributing some or all aggregated statistics to the hosts so that their agents can generate other rules or criteria. One of ordinary skill in the art will realize that in some embodiments the policies, rules and/or criteria are not always adjusted based on the aggregated statistics, but rather are modified only when the aggregated statistics require such modification.

Irrespective of the implementation for updating the policies, rules, and/or criteria, the collection and aggregation of the data traffic statistics allows the switching rules or criteria to be dynamically adjusted. For instance, when the statistics show one service node as being too congested with data traffic, the load balancing rules or criteria can be adjusted dynamically for the load balancers that send data messages to this service node, in order to reduce the load on this service node while increasing the load on one or more other service node in the same service node cluster. In some embodiments, the collection and aggregation of the data traffic statistics also allows the controller set 120 to reduce the load on any service node in a service-node cluster by dynamically directing a service-node management controller set (not shown) to provision new service node(s) or allocate previously provisioned service node(s) to the service cluster.

Figure 2:
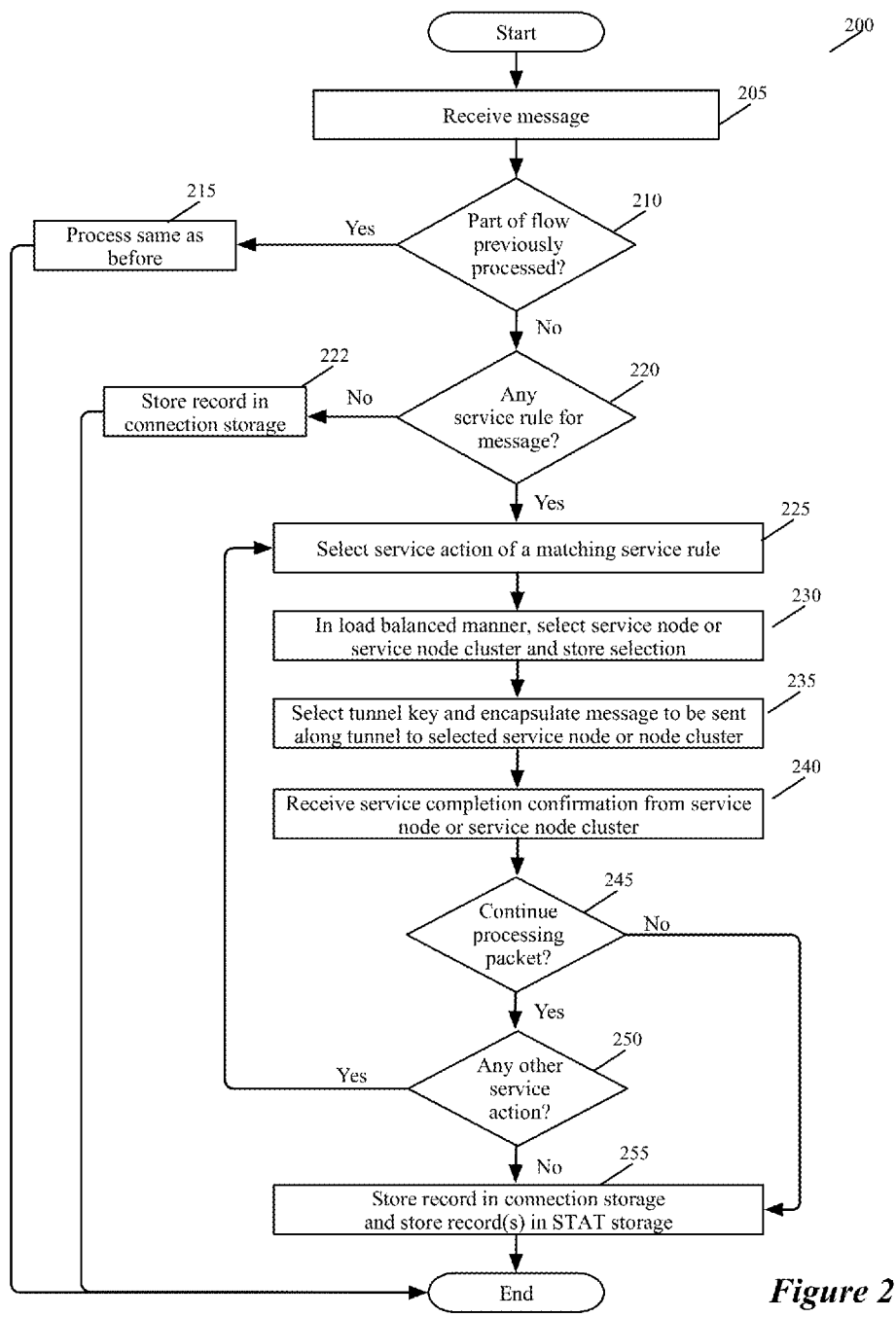
FIG. 2 conceptually illustrates a process that an inline service switch performs in some embodiments.
Figure 3:
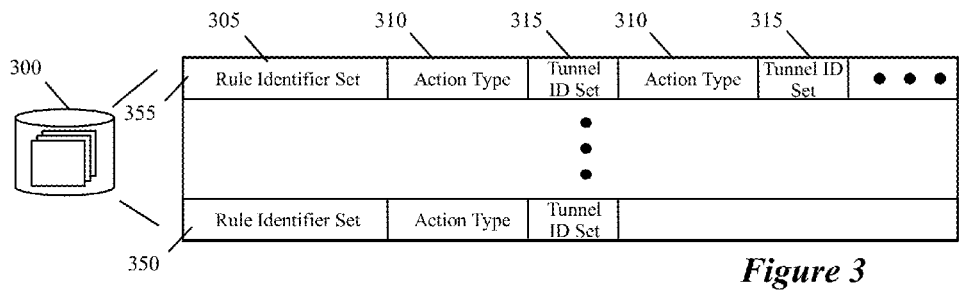
FIG. 3 illustrates different examples of service rules.
Figure 4:
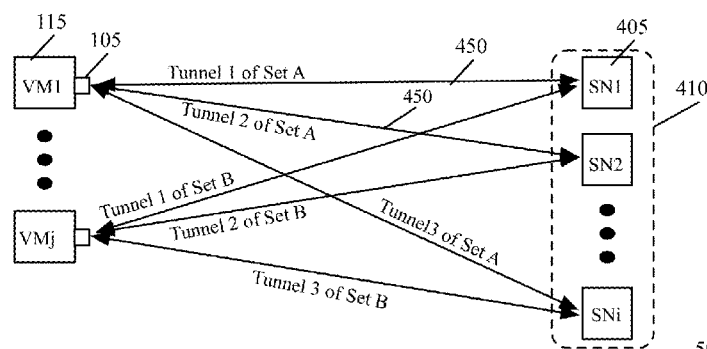
FIG. 4 conceptually illustrates distributing data message flows to services nodes in one service node cluster.
Figure 5:
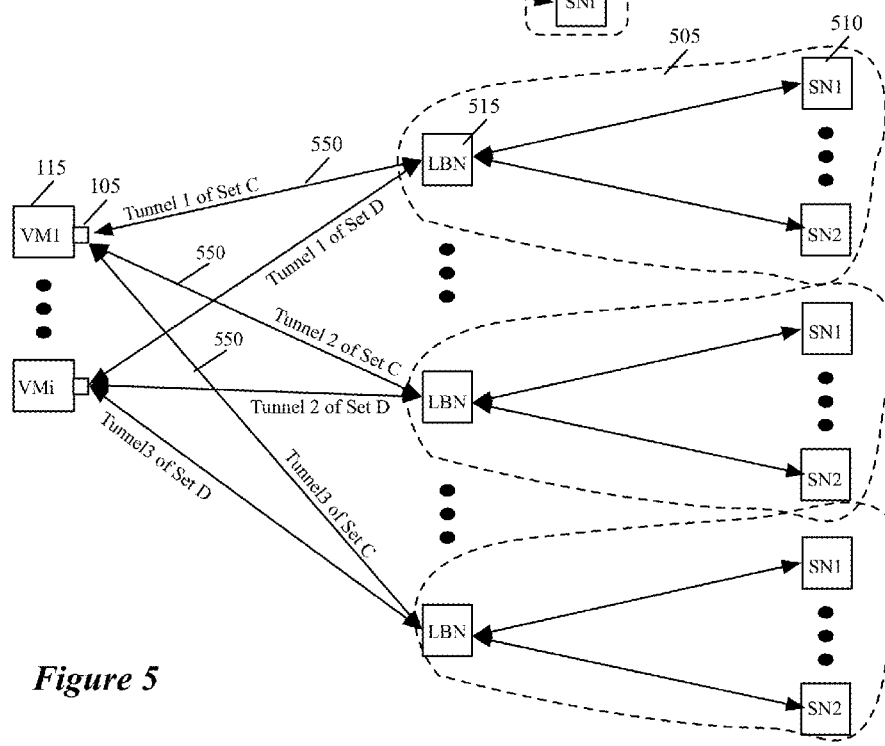
FIG. 5 conceptually illustrates distributing data message flows to different service node clusters that perform the same service.

FIG. 2 illustrates a process 200 that an ISS 105 of a VM 115 performs for a data message sent by the VM. In performing this process, the ISS 105 (1) determines whether the data message should be processed by one or more service nodes or clusters, and (2) if so, selects a service node or cluster for processing the data message and forwards the data message to the selected node or cluster through a tunnel. To select a service node or service-node cluster, the ISSS performs a load balancing operation to ensure that the data message flows that it processes are distributed among several service nodes or clusters based on a set of load balancing criteria. The process 200 will be described below by reference to FIGS. 3-5. FIG. 3 different examples of service rules enforced by the process 200 in some embodiments. FIGS. 4 and 5 respectively show an ISS 105 distributing data message flows to service nodes 305 in one service node cluster 310, and distributing data message flows to different service-node clusters 405 that perform the same service.

The process 200 starts when the ISS 105 receives a data message that its associated VM sends. As mentioned above, the ISS 105 is deployed in the VM's egress datapath so that it can intercept the data messages sent by its VM. In some embodiments, the ISS 105 is called by the VM's VNIC or by the SFE port that communicatively connects to the VM's VNIC.

At 210, the process determines whether the data message is part of a data message flow for which the process has processed other data messages. In some embodiments, the process makes this determination by examining a connection storage that the ISS maintains to keep track of the data message flows that it has recently processed. Two data messages are part of the same flow when they share the same message headers. For example, two packets are part of the same flow when they have the same five tuples identifier, which includes the source IP address, destination IP address, source port, destination port, and protocol.

As further described below by reference to 255, the connection storage stores one record for each data message flow that the ISS has recently processed. This record stores a description of the set of service rules that have to be applied to the flow's data messages or has a reference (e.g., a pointer) to this description. In some embodiments, when the operation of the service rule set requires the data message to be dropped, the connection-storage record also specifies this action, or specifies this action in lieu of the service rule description. Also, when no service has to be performed for data messages of this flow, the connection-storage record indicates that the ISS should allow the received data message to pass along the VM's egress datapath.

In some embodiments, this record stores the flow's identifier (e.g., the five tuple identifiers). In addition, the connection storage is hash addressable (e.g., locations in the connection storage are identified based on a hash of the flow's identifier) in some embodiments. When the process determines (at 210) that it has previously processed a data message from the same flow as the received data message, it transitions to 215, where it performs the action or service-rule set that was previously specified for data messages of this flow in the connection-storage record for this flow. After performing these service operations, the process 200 provides (at 215) a data message to the module (e.g., SFE port or VNIC) that called it, assuming that the service operations do not require the data message to be dropped, in which case the process so notifies the calling module. Typically, because of the service operation(s) performed, the data message that the process 200 returns to the calling module is a modified version of the data message received at 205. The modified data message may have different header value and/or datagram (i.e., payload) than the received data message. In some cases, the returned data message might be identical to the received data message. After 215, the process ends.

When the process determines (at 210) that it has not previously processed a data message from the same data message flow, the process determines (at 220) whether the service rules that it enforces require one or more service actions to be performed on the received data message. In some embodiments, the ISS has a service rule storage that stores several service rules that the ISS enforces. Each service rule can be associated with one or more data message flows from the inline switch's VM, and different service rule can be associated with different data message flows from this VM. In some embodiments, each service rule in the service rule storage has (1) an associated set of data message identifiers (e.g., packet header values) and (2) a set of one or more actions.

The process 200 determines (at 220) whether the received data message's identifiers (e.g., five tuples) match the data message identifiers of any service rule in its service rule storage. When a data message matches more than one service rule, the process 200 of some embodiments only performs the set of actions that is specified by the highest priority matching service rule. In some such embodiments, the service rule storage stores the rules according to a sort that is based on their priorities so that the process 200 first matches the data message to a higher priority rule before being able to match it to a lower priority rule, when more than one rule matches the data message.

When the received data message's header values do not match the rule-matching identifier of any service rule that specifies a service action in the service rule storage, the process 200 determines that it does not need to forward the data message to any service node to perform any service action. Hence, it creates (at 222) a record in the connection storage to specify that no service action is needed for data messages that are part of the same flow as the received data message. For some embodiments of the invention, the structure of the connection storage was described above and further described below. At 222, the process also notifies the module (e.g., SFE port or the VM VNIC) that called it that the process has finished processing the data message. In some embodiments, this notification is not accompanied by the data message, while in other embodiments, this notification is accompanied by the data message. In sending this notification, the process 200 is allowing the received data message to pass without any service being performed on it. After 222, the process ends.

When the received data message's identifiers match the rule-matching identifier of one or more service rules in the service rule storage, the process performs 225-250 to process the actions of the matching service rule or rules. In some embodiments, each service rule can specify only one action, while in other embodiments, a service rule can specify a sequence of one or more actions. A service action in some embodiments entails forwarding the matching data messages to a service node or cluster. For such an action, the service rule identifies directly, or through another record (to which the rule refers), the service nodes of a cluster or service-node clusters of a group of service clusters for performing the service. As further described below, the process 200 selects one of the identified service nodes or clusters.

FIG. 3 illustrates several examples of service rules specifying service actions. This figure illustrates a service rule storage 300 that stores multiple service rules. Each service rule has an associated service rule identifier set 305 that is expressed in terms of one or more data message header values (e.g., one or more five tuple values, as described above). The process 200 compares the service rule identifier set to a data message's header values in order to determine whether the service rule matches a received data message.

Each service rule also specifies one or more actions, with each action being specified in terms of an action type 310 (e.g., firewall action type, IPS action type, IDS action type, etc.) and a tunnel ID set 315. In some embodiments, the tunnel ID set of each action of a service rule identifies (1) one or more tunnels between the ISS and one or more service nodes in a cluster, or (2) one or more service clusters in a service cluster group that provides the service. In some embodiments, the tunnel ID sets of the service rules are supplied as a part of the data initially supplied by the ISS controller set (e.g., in order to configure the ISS) or are supplied in subsequent updates that is provided by the controller set.

When a service rule specifies more than one action, the actions can be associated with more than one service. In this manner, a service rule can specify a sequence of service operations that need to be performed on a matching data message. As mentions above, some embodiments store the service rules in the data storage 300 according to a sort that is based on the rule priorities, because the process 200 in these embodiments matches a data message to only one service rule, and the sorted order allows the process to match a data message to a matching higher priority rule instead of lower priority matching rule.

In the example illustrated in FIG. 3, service rule 350 has one associated action, while service rule 355 has multiple associated actions. In other embodiments, each service rule can only specify one service action. Also, in other embodiments, the service rule does not directly identify the tunnel ID for the service node or cluster. For instance, in some embodiments, the process 200 identifies the tunnel ID by using a service-node identifier or service-cluster identifier to retrieve the tunnel ID from a table that identifies these IDs.

At 225, the process selects a service action of a service rule that matches the received data message header value. When a matching service rule specifies a sequence of two or more service actions, the process 200 maintains a record (e.g., a count) that identifies where it is in the sequence of actions that it has to perform so that when it returns to 225 it will know which is the next service action that it has to select in the sequence. This will be further described below.

In some embodiments, this service action has an associated tunnel ID set 315 that specifies one or more tunnels of one or more service nodes or service node clusters that perform the service action. Accordingly, at 230, the process 200 uses the load balancer of the ISS to select for the data message in a load-balance way, one service node or one service node cluster from the set of service nodes or service-node clusters that are identified by the tunnel ID set. In some embodiments, the ISS load balancer distributes the load in a stateful manner so that data messages that are part of the same flow are processed by the same service node or the same service node cluster.

To select service nodes or service-node clusters in a load-balance manner, each service rule in some embodiments specifies a set of weight values (not shown) for each of the rule's specified tunnel ID set. Alternatively, in other embodiments, each service rule refers to another record that identifies the weight value set for each tunnel ID set identified for the rule. Each weight value set specifies a weight value for each tunnel ID in the associated tunnel ID set, and provides the load-balancing criteria for the ISS load balancer to spread the traffic to the service nodes or clusters that are identified by the tunnel ID set.

For instance, in some embodiments, the ISS load balancer uses these weight values to implement a weighted round robin scheme to spread the traffic to the nodes or clusters. As one example, assume that the tunnel ID set has five tunnel IDs and the weight values for the tunnel IDs are 1, 3, 1, 3, and 2. Based on these values, the ISS load balancer would distribute data messages that are part of ten new flows as follows: 1 to the first tunnel ID, 3 to the second tunnel ID, 1 to the third tunnel ID, 3 to the fourth tunnel ID, and 2 to the fifth tunnel ID. As further described below, the weight values for a service rule are generated and adjusted by the ISS agent 135 and/or ISS controller set 120 in some embodiments based on the statistics that the controller set collects from the inline switches. To gracefully switch between different load balancing criteria, a tunnel ID set can have multiple weight value sets and the service rule in some embodiments can specify different time periods during which different weight values (i.e., different load balancing criteria) of the tunnel ID set are valid.

After selecting (230) a service node or service-node cluster for the data message, the process (at 235) identifies a tunnel key, encapsulates the data message with a tunnel header (that includes the identified tunnel key) for the tunnel to the selected service node or service-node cluster, and provides this tunnel-header encapsulated data message to its host's SFE for forwarding to the selected service node or service-node cluster. Examples of such tunnels and keys are GRE tunnels, Geneve tunnels, GRE keys, Geneve keys, etc. As further described below, the inline switches of some embodiments also use other redirection mechanisms (such as MAC redirect, destination network address translation, etc.) to forward data messages to some of the service nodes and service-node clusters.

Tunnel keys (e.g., GRE keys) allow multiple data message flows to share the same tunnel. For each data message flow, the process in some embodiments uses one GRE key to send the flow's data messages to service node or cluster at the other end of the tunnel and to receive responsive data messages in response to the sent data messages from this node or cluster. For data messages from the service node or cluster, the tunnel key also allows the process 200 to associate the data message to the data message that the process sent to the service node or cluster.

FIG. 4 presents an example that shows the inline service switches 105, of several related VMs 115 executing on the same host or on different hosts, using several tunnels 450 to distribute their VM data messages to several service nodes 405 of a service node cluster 410 that perform the same service (e.g., a firewall service or an IPS service) on these messages. An ISS performs a load balancing operation to select the service node for each data message flow.

In FIG. 4, each tunnel is established between an ISS 105 and a service node 405 in the cluster. For data messages of different flows that share the same tunnel to the same service node, an ISS 105 uses different tunnel keys so that different flows can share the same tunnel. Also, through each service-node tunnel, the ISS receives data messages in response to the data messages that it sends to the service node, and uses the tunnel keys to associate each responsive data message with a data message that it sent.

In some embodiments, each service node 405 is a stand-alone appliance. In other embodiments, one or more service nodes 405 are servers executing on a host computer. For such service nodes, the tunnels 405 in some embodiments are tunnels that are provisioned for the host computer, or for an SFE of the host computer, on which the service node executes. On the inline-switch side, the tunnel can also be provisioned at the host level in some embodiments. In other words, in some embodiments, two or more inline switches 105 that execute on the same host computer uses the same tunnel to a service node.

FIG. 5 presents an example that shows the inline service switches 105, of several related VMs 115 executing on the same host or on different hosts, using several tunnels 550 to distribute their VM data messages to several service-node clusters 505 that perform the same service (e.g., a firewall service or an IPS service) on these messages. In this example, an ISS performs a load balancing operation to select the service cluster for each data message flow. As in the example of FIG. 4, different tunnel keys are used to identify data messages of different flows that share the same tunnel in the example of FIG. 5.

In the example illustrated in FIG. 5, each service cluster 505 has multiple service nodes 510 that perform the same service, and a load-balancing webserver set 515 (with one or more webservers) that distributes the received data messages to the service nodes of its cluster. In this example, each tunnel is established between the ISS 105 and a load-balancing webserver 515 of the cluster. Through its load balancing operation 230, the ISS selects one cluster in the group of clusters of FIG. 5, in order to distribute the service load to the different clusters that perform the same service. The load-balancing webservers 515 of each cluster then have the task of distributing each cluster's load among the cluster's service nodes. In some embodiments, these webservers distribute the load in a stateful manner so that the same service node in the cluster processes data messages that are part of the same flow.

In some embodiments, the different service clusters of a service cluster group illustrated in FIG. 5 are in different datacenters at different locations. Having different service clusters in different locations that perform the same service can be advantageous in that it allows different ISS in different locations to bias their service cluster selection to service clusters that are closer to the ISS location. Also, having different service clusters perform the same service action also provides different tenants in a datacenter the ability to pick different service providers for the same service and to easily switch between these providers without the need to reconfigure the inline switches or their servers (e.g., their VMs or containers). In other embodiments, one or more of these service clusters 505 are in the same datacenter. Such service clusters might be created when different service providers provide the same service in one datacenter.

Also, the architecture illustrated in FIG. 5 is also used in some embodiments to terminate tunnels on non-service node elements (e.g., on load balancers such as load balancers 515) that distribute data messages that they receive from the inline switches 105 to one or more service nodes that perform the same service or different services. In one such approach, service nodes 515 of one service provider can be in different clusters 505. Also, in such an approach, each service cluster can have just one service node. In view of the foregoing, one of ordinary skill will realize that the tunnel that an inline switch uses to forward data message to a service node does not necessarily have to terminate (i.e., does not have to be provisioned) at the service node, but can terminate at a machine or appliance that forwards the data messages it receives through the tunnel to the service node.

A time period after sending (at 235) the data message to the service node or cluster, the process receives (at 240) a service completion confirmation from the service node or cluster through the tunnel that was used to send the data message at 235. The confirmation is part of one or more data messages that are received from the service node or cluster and that are encapsulated with the tunnel header with the tunnel key. The tunnel key allows the process 200 to associate the received data message(s) with the sent data message (i.e., the data message sent at 235).

The received confirmation might indicate that the data message should be dropped (e.g., when the service node performs a security service operation (e.g., firewall, IPS, IDS, etc.) that determines that the data message should be dropped). Alternatively, the confirmation data message(s) might return a data message with one or more modified data message header. These modified header values may re-direct the data message to a different destination once the process 200 completes its processing of the data message.

Also, the confirmation data message(s) in some embodiments might return a new or modified payload to replace the payload of the data message that was sent at 235 to the service node or cluster. For instance, when the service node or cluster performs an encryption or compression operation, the new payload might be the encrypted or compressed version of the payload of the sent data message. When the returned data message(s) provide a new or modified payload for the sent data message, the process 200 replaces the sent data message payload with the received new or modified payload before having another service node or cluster perform another service on the data message, or before having the SFE forward the data message to its eventual destination.

After receiving (at 240) the service completion confirmation, the process 200 determines (at 245) whether it should continue processing the data message. When the received confirmation indicates that the data message should be dropped, the process 200 transitions to 255, where it creates a record in the ISS connection storage to specify that data messages that are part of the same flow (as the data message received at 205) should be dropped. This record is created so that for subsequent data messages that are part of the same flow, the process does not have to search the service rule data storage and to perform the service actions before it determines that it should drop the data message. At 255, the process 200 also updates the statistics that it maintains in the ISS STAT storage to reflect the current data message's processing by the service node or nodes that processed this data message before it was dropped.

Alternatively, when the process determines (at 245) that it should continue processing the data message, it determines (at 250) whether its service rule check at 220 identified any other service actions that it has to perform the current data message. As mentioned above, the process in some embodiments can identify multiple matching service rules with multiple service actions that have to be performed on the data message. In other embodiments, the process can only identify one matching service rule to the data message. However, in some embodiments, a matching service rule might specify multiple service actions that have to be performed on a data message.

Accordingly, when the process determines (at 250) that it needs to perform another service action on the data message, it returns to 225 to select another service action and to repeat operations 230-250. When a matching service rule specifies a sequence of two or more service actions, the process 200 maintains a record (e.g., a count) that identifies where it is in the sequence of actions that it has to perform so that when it returns to 225 it will know which is the next service action that it has to select in the sequence. In other words, this record maintains the state where the process is in the service policy chain that it has to implement for a received data message.

Figure 6:
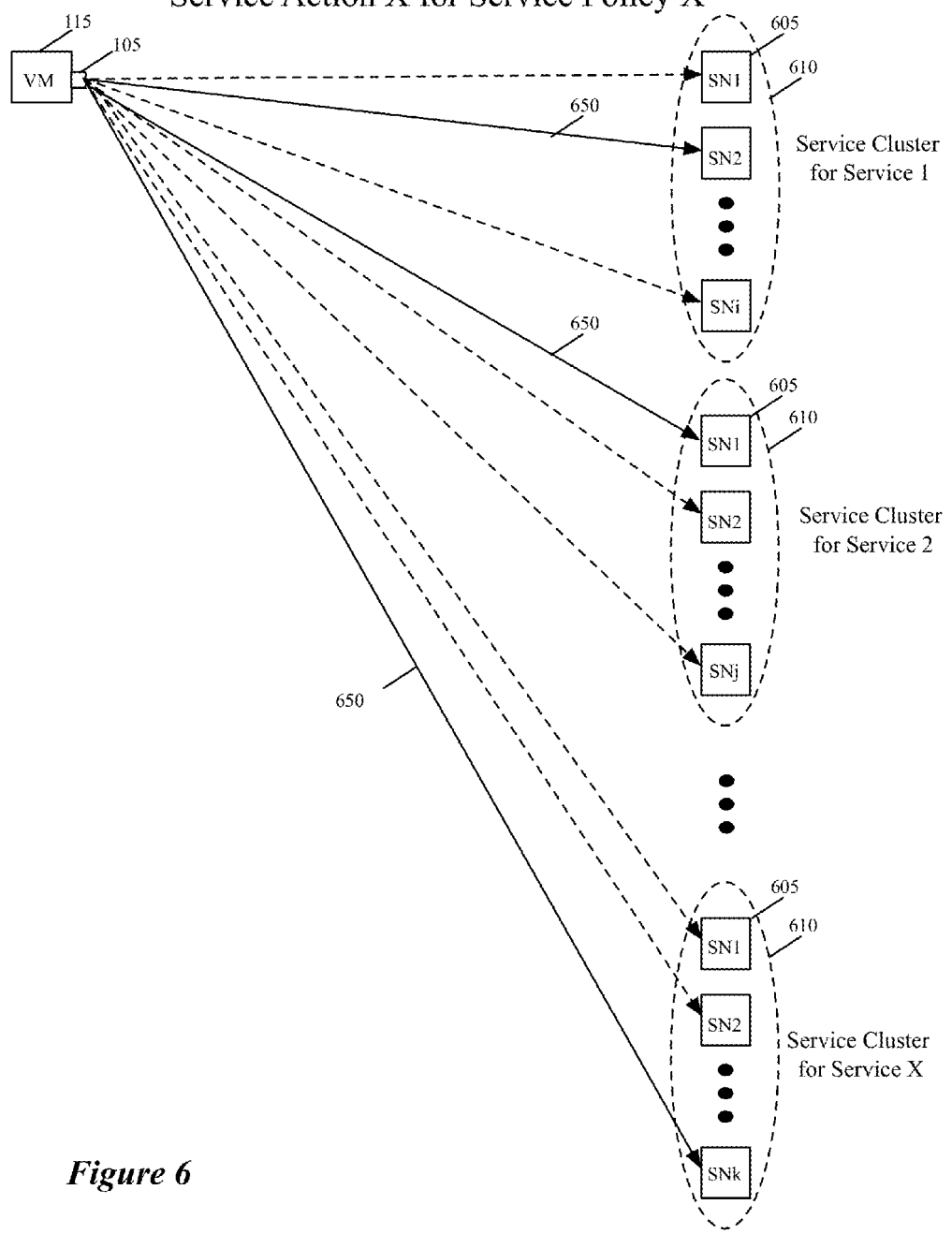
FIG. 6 illustrates an example of an ISS sequentially calling multiple different service nodes of different clusters.

FIG. 6 illustrates an example of an ISS sequentially calling multiple different service nodes of different clusters that perform different services in order to implement a complex service policy that involves multiple different individual service policies. This figure illustrates an ISS 105 of a VM 115 sequentially using X service nodes 605 of X different service clusters 610 to perform a complex service policy that involves X individual service action, where X is an integer. As shown, the ISS uses different tunnels 650 to send data messages to the X service nodes. FIG. 6 shows the tunnels that are used to process the data message in terms of solid lines, while showing other candidate tunnels that the ISS 105 does not select in terms of dashed lines. The use of the tunnels allows some or all of the clusters to be in the cloud. In other words, the tunnels allow the ISS to seamlessly implement a cloud-based XaaS model.

In some embodiments, the different service clusters 610 can be located in the same datacenter with each other, or in different datacenters. Also, a service cluster 610 can be located in the same datacenter as the VM 115 and ISS 105, or it can be in a different datacenter. The VM 115 is in a private datacenter (e.g., in an enterprise datacenter) while the one or more service clusters are in a public multi-tenant datacenter in a different location. As mentioned above, the tunnel-based approach for distributing data messages to service nodes/clusters in the same datacenter or different datacenters is advantageous for seamlessly implementing a cloud-based XaaS model, in which any number of services are provided by service providers in the cloud.

In some embodiments, when an inline switch 105 sequentially calls multiple service nodes or clusters to perform multiple service actions for a data message that the switch has received, the inline switch sends a data message to each service node or cluster that is identical to the data message that the inline service switch initially receives when the process 200 starts, or identical to the data message that the inline service switch receives from a previous service node that performed a previous service action on a data message that the inline service switch sent to the previous service node. In other words, in these embodiments, the inline switch just relays in the tunnels that connect it to the service nodes or clusters, the data messages that it receives (at 205) at the start of the process 200 and receives (at 240) from the service nodes. In these situations, the inline switch just places a tunnel packet header on the data message that it receives before forwarding it to the next service action node.

In performing its service action on a received data message, one service node might modify the data message's header value and/or its datagram before sending back the modified data message. Notwithstanding this modification, the discussion in this document refers to all the data messages that are received by the inline switch during the execution of the process 200 (i.e., while this switch is directing the service node(s) or cluster(s) to perform a desired sequence of service operations that are initiated when the first data message is received at 205 to start the process 200) as the received data message. One of ordinary skill will realize that after each service operation, the data message can be modified so that the resulting message is not similar (e.g., has a different header value or different datagram) to the message on which the operation was perform.

Also, one of ordinary skill will realize that in some embodiments the inline switch might just send a portion of a received data message to the service node. For instance, in some embodiments, the inline switch might send only the header of a data message, a portion of this header, the payload of the data message, or a portion of the payload. Analogously, the service nodes in some embodiments do not send back a data message that is a modified version of a data message that they receive, but instead send back a value (e.g., Allow, Drop, etc.).

When the process determines (at 250) that it has performed all service actions that it identified for the data message received at 205, the process creates (at 255) a record in the ISS connection storage to specify the service action or service-action sequence that should be performed for data messages that are part of the same flow (as the data message received at 205). This record is created so that for subsequent data messages that are part of the same flow, the process does not have to search the service rule data storage. Instead, at 210, the process can identify for these subsequent data messages the service action(s) that it has to perform from the record in the connection storage, and it can perform these actions at 215. For each service action that the process 200 identifies in the connection storage, the process also identifies, in the connection storage record, the identified service node or cluster (i.e., the node or cluster identified at 225) that has to perform the service action, so that all the data messages of the same flow are processed by the same service node or cluster for that service action.

At 255, the process 200 also updates the statistics that it maintains in the ISS STAT storage to reflect the current data message's processing by the service node or nodes that processed this data message. After performing the service operations, the process 200 provides (at 255) a data message to the module (e.g., SFE port or VNIC) that called it, assuming that the service operations do not require the data message to be dropped, in which case the process so notifies the calling module. Again, because of the service operation(s) performed, the data message that the process 200 returns to the calling module is typically a modified version of the data message received at 205 (e.g., has one or more different header value and/or a modified payload), but in some cases, the returned data message might be identical to the received data message. After 255, the process ends.

In several examples described above by reference to FIGS. 2-6, the inline switch selects in a load-balanced manner a service node or cluster for processing a data message, and then sends the data message to the selected node or cluster through a tunnel. In other embodiments, the inline switch does not select a service node from several service nodes, nor does it select a service cluster from several service clusters. For instance, in some embodiments, the inline switch simply relays a data message along one tunnel to a service cluster so that a load-balancing node at the service cluster can then select a service node of the cluster to perform the service.

In some of these embodiments, at least one service cluster implements an elastic model in which one primary service node receives the cluster's data messages from the inline service switches. This service node then either performs the service on the data message itself or directs the data message (e.g., through L3 and/or L4 network address translation, through MAC redirect, etc.) to one of the other service nodes (called secondary service nodes) in the cluster to perform the service on the data message. The primary service node in some embodiments elastically shrinks or grows the number of secondary service nodes in the cluster based on the received data message load.

Figure 7:
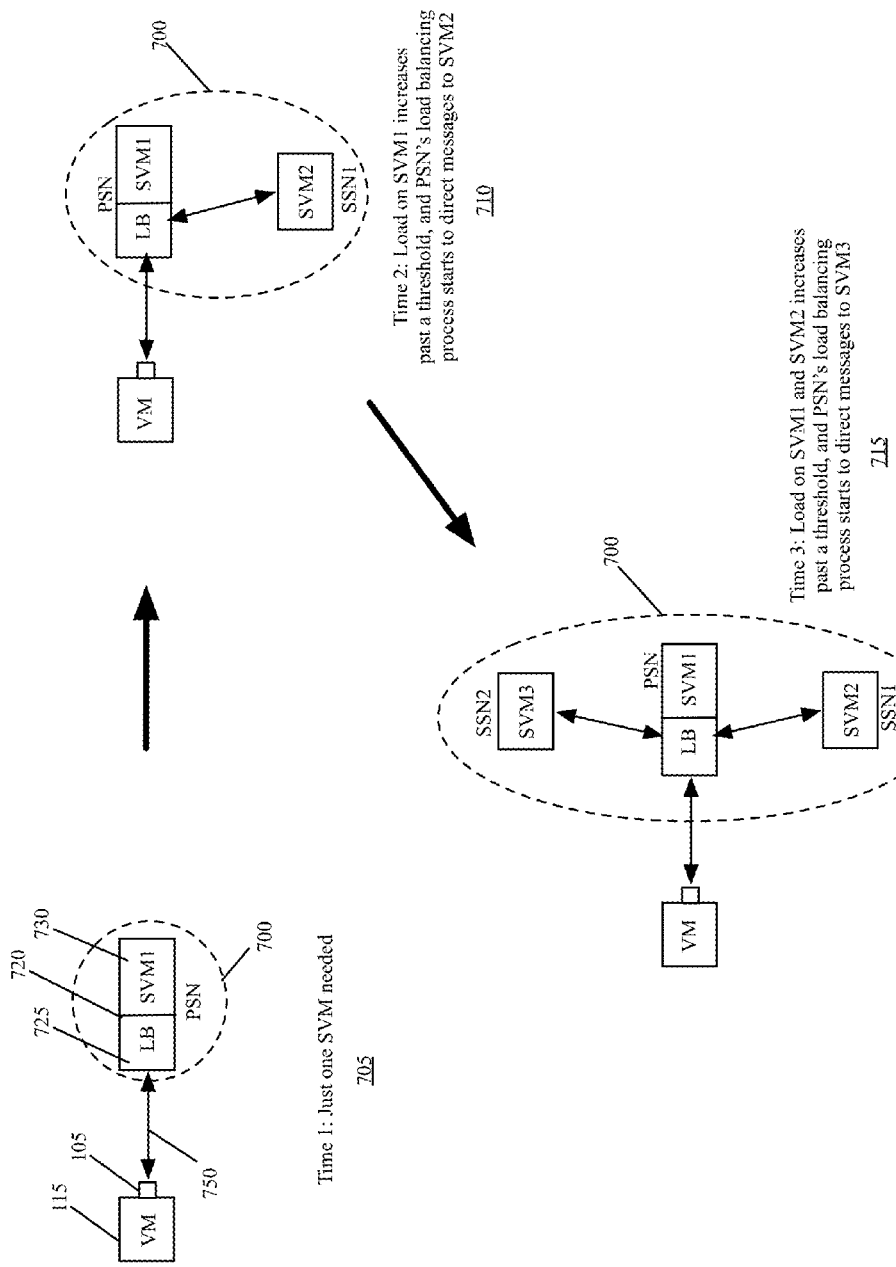
FIG. 7 illustrates an example of an elastic service model that uses one primary service node and zero or more secondary service nodes.

FIG. 7 illustrates an example of such an elastic service model that uses one primary service node and zero or more secondary service nodes. This example is illustrated in three stages 705-715 that illustrate the operation of a service node cluster 700 at three different instances in time. The first stage 705 illustrates that at a time T1, the cluster includes just one primary service node (PSN) 720. As shown, the PSN 720 has a load balancer (LB) and a service virtual machine (SVM).

In the first stage 705, the PSN receives all data messages on which the cluster has to perform its service. These messages are sent by an inline switch 105 captures and sends from its VM to the cluster 700 through a tunnel 750. In the first stage 705, the PSN's SVM 730 performs the needed service on these messages, and then directs these messages back to the inline switch 105 through the tunnel 750.

The second stage 710 illustrates that a time T2, the cluster has been expanded to include another service node, SSN1, which is implemented by a second service virtual machine. In some embodiments, the service node SSN1 is added to the cluster because the data message load on the cluster has exceeded a first threshold value. In some embodiments, a service-node controller set (not shown) adds SSN1 when it detects that the data message load has exceeded the first threshold value, or when the PSN detects this condition and directs the controller set to add SSN1. In some embodiments, the service-node controller set obtains the data message load from the PSN.

To assess whether the data message load exceeds a threshold value, the controller set or PSN in different embodiments quantify the data message load based on different metrics. In some embodiments, these metrics include one or more of the following parameters: (1) number of flows being processed by the cluster or by individual service nodes in the cluster, (2) number of packets being processed by the cluster or by individual service nodes in the cluster, (3) amount of packet data being processed by the cluster or by individual service nodes in the group.

The second stage 710 also illustrates that at time T2 the PSN performs the cluster's service on some of the data message flows, while directing other data message flows to SSN1 so that this service node can perform this service on these other flows. Once either the PSN or SSN1 performs the service on a data message, the PSN directs the data message to the ISS 105. As shown, once the SSN1 performs the services, this service node in some embodiments returns the data message to the PSN, which directs it back to the ISS. In other embodiments, the SSNs return the processed data messages directly to the inline switch. In some of these embodiments, the SSNs and the inline switches are configured to insert the appropriate packet header values and to examine the appropriate packet header values to identify data messages that have been processed by the SSNs. In still other embodiments, the SSNs establish tunnels with the inline switches (e.g., with the hosts of the inline switches) once the SSNs are provisioned so that they can return their processed messages directly to the inline switches.

The load balancer 725 of the PSN performs a load balancing operation that selects which service node (primary or secondary) in the cluster should perform the group's service on each data message that the PSN receives. In some embodiments, the load balancer 725 distributes the data messages based on a hash of the different tunnel keys that the ISS 105 uses to send different data-message flows through the tunnel 750. This hashing ensures that the data messages that are part of the same flows are processed by the same service node in the cluster. The load balancing is also based on some of the inner packet header values in some embodiments. In other embodiments, the load balancing is just based on the inner packet header values (i.e., it is not based on the tunnel keys). In some embodiment, the load balancer 725 stores in a connection storage a record of each service node selection for each data-message flow, and uses this record to forego re-assessing selection of a service node for a flow after picking a service node for the first data message in the flow. In some embodiments, the load balancer of the PSN also determines when service nodes should be added to or removed from the cluster.

The third stage 715 illustrates that a time T3, the cluster has been expanded to include yet another service node, SSN2, which is a third service virtual machine. In some embodiments, the service node SSN2 is added to the cluster because the data message load on the cluster has exceeded a second threshold value, which is the same as the first threshold value in some embodiments or is different than the first threshold value in other embodiments. Some embodiments add the service node SSN2 when the load on either PSN or SSN1 exceed a second threshold amount. Other embodiments add a new service node when the load on N (e.g., two or three) service nodes exceeds a threshold value. As before, the service-node controller set in some embodiments adds SSN2 when it or the PSN detects that the data message load has exceeded the second threshold value.

The third stage 715 also illustrates that time T3, the PSN performs the cluster's service on some of the data message flows, while directing other data message flows to SSN1 or SSN2, so that these service nodes can perform this service on these other flows. As shown, once any of the service nodes, PSN, SSN1, or SSN2, performs the service on a data message, the PSN returns the data message to the ISS 105 through the tunnel 750. After processing the data message, SSN2, like SSN1, provides its reply data message to the PSN so that the PSN can forward this message to the ISS 105 through the tunnel 750.

Figure 8:
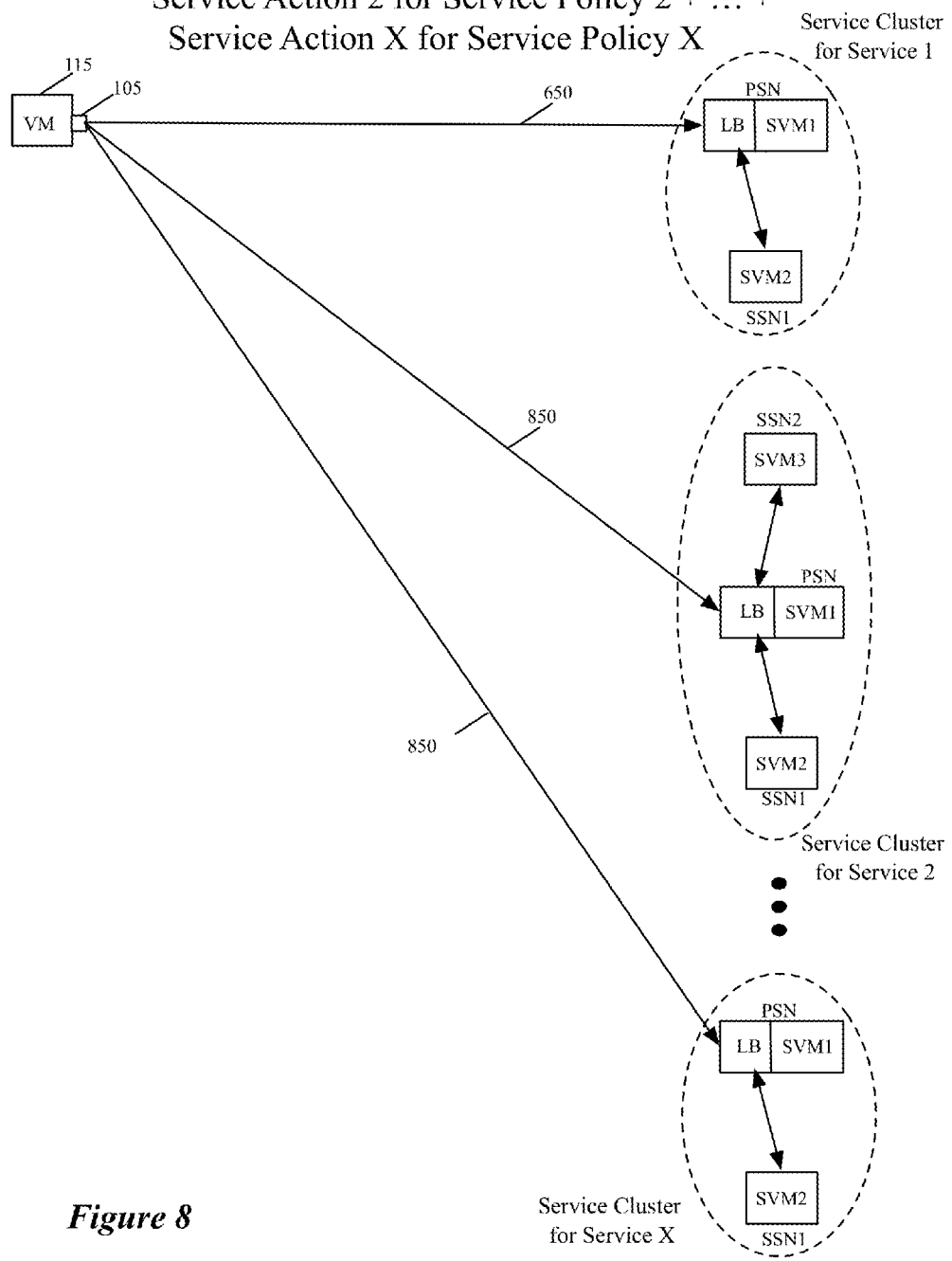
FIG. 8 illustrates an example of sequentially forwarding a data message from a VM to different elastically adjustable service cluster.

FIG. 8 illustrates an example where the ISS 105 of a VM 115 sequentially forwards a data message from the VM to different clusters of elastically adjusted service-node clusters. In this example, different service clusters perform different service operations on the data message. In some embodiments, SSNs of one cluster can be PSNs of other clusters, when the multiple clusters reside in the same location.

The ISS 105 connects to the PSN of each service cluster through a tunnel, which allows each service cluster to reside outside of the ISS' local area network. By sequentially relaying the data message to different service clusters, the ISS 105 can implement a complex service policy with multiple service actions (X in this example) on the data message. The use of the tunnels allows some or all of the clusters to be in the cloud. In other words, the tunnels allow the ISS to seamlessly implement a cloud-based XaaS model.

Figure 9:
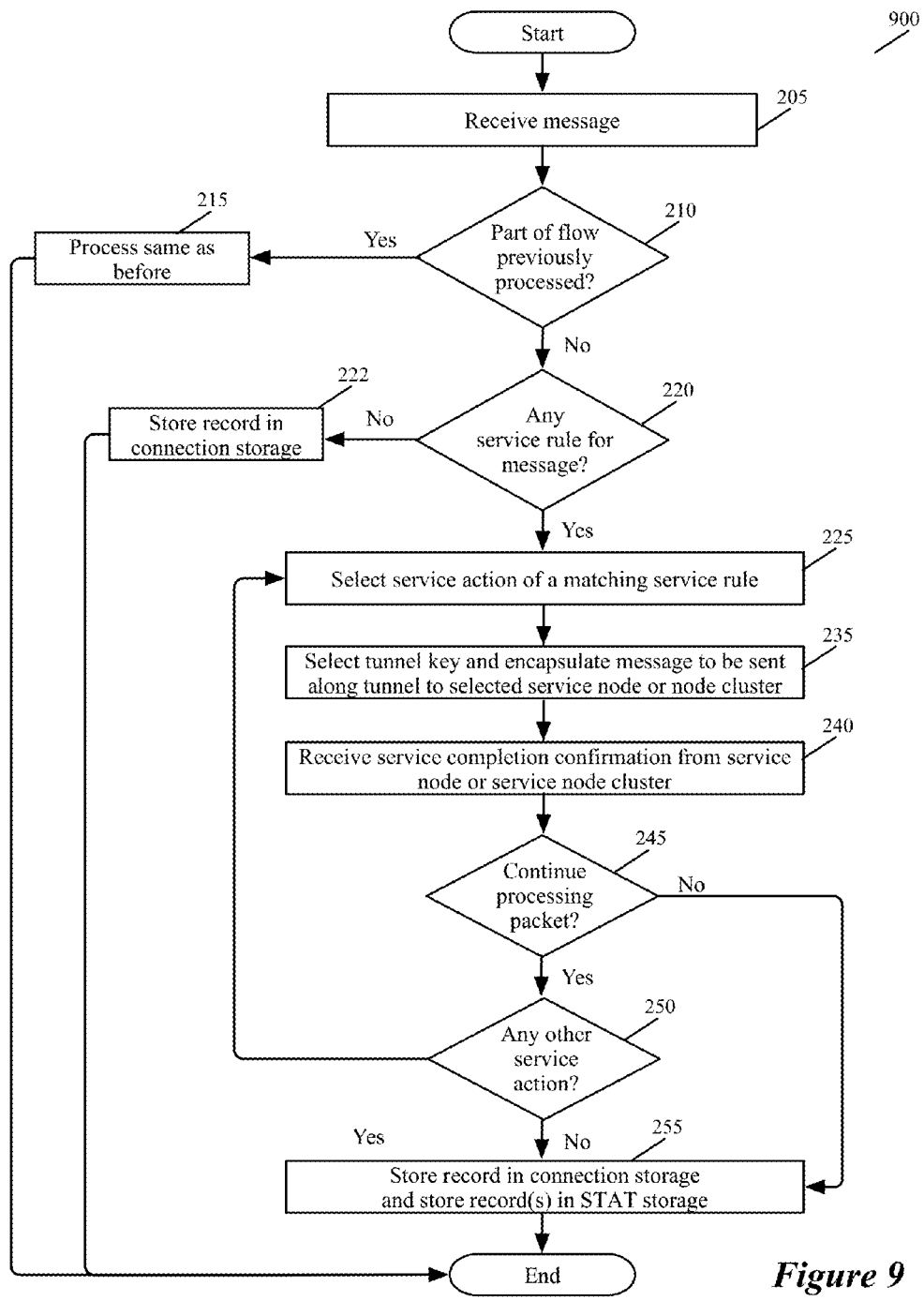
FIG. 9 conceptually illustrates another process that the inline service switch performs in some embodiments.

FIG. 9 illustrates a process 900 that the ISS 105 performs in some embodiments to process data messages with one or more elastically adjusted service node clusters. This process is identical to the process 200 of FIG. 2 except that process 900 does not perform the load-balancing operation 230 to select a service node in the cluster. As shown, after identifying (at 225) a service action that is to be performed by a service node of a service cluster, the process 900 just forwards (at 235) the data message to the service cluster along the tunnel that connects the ISS to the service cluster.

Figure 10:
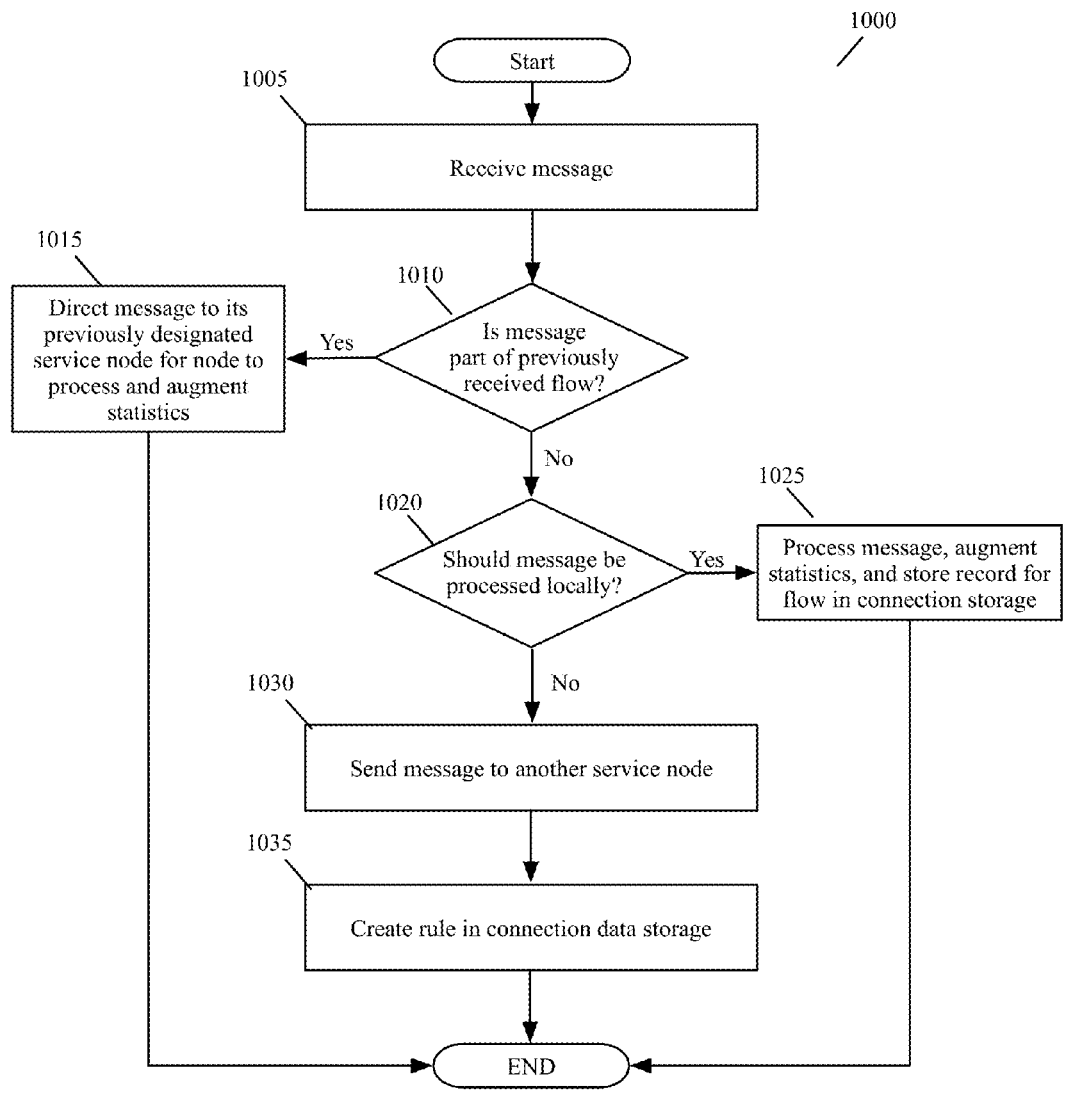
FIG. 10 conceptually illustrates a process that a primary service node performs in some embodiments of the invention.

FIG. 10 conceptually illustrates a process 1000 that such a PSN performs whenever the PSN receives a data message in some embodiments. The process 1000 identifies one service node in the PSN's SN group that should process the received data message, and then directs the identified service node to perform the SN group's service for the received data message. The identified service node can be the PSN itself, or it can be an SSN in the SN group.

As shown in FIG. 10, the process 1000 starts (at 1005) when the PSN receives a data message through a tunnel from an ISS filter. After receiving the data message, the process determines (at 1010) whether the received message is part of a particular data message flow for which the PSN has previously processed at least one data message.

To make this determination, the process examines (at 1010) a connection-state data storage that stores (1) the identity of each of several data message flows that the PSN previously processed, and (2) the identity of the service node that the PSN previously identified as the service node for processing the data messages of each identified flow. In some embodiments, the process identifies each flow in the connection-state data storage in terms of one or more flow attributes, e.g., the flow's five tuple identifier. Also, in some embodiments, the connection-state data storage is hash indexed based on the hash of the flow attributes (e.g., of the flow's five tuple header values). For such a storage, the PSN generates a hash value from the header parameter set of a data message, and then uses this hash value to identify one or more locations in the storage to examine for a matching header parameter set (i.e., for a matching data message flow attribute set).

When the process identifies (at 1010) an entry in the flow connection-state data storage that matches the received data message flow's attributes (i.e., when the process determines that it previously processed another data message that is part of the same flow as the received data message), the process directs (at 1015) the received data message to the service node (in the SN group) that is identified in the matching entry of the connection-state data storage (i.e., to the service node that the PSN previously identified for processing the data messages of the particular data message flow). This service node then performs the service on the data message. This service node can be the PSN itself, or it can be an SSN in the SN group. After performing (at 1015) the service on the data message, the SN returns a reply data message (e.g., the processed data message) to the ISS filter that called it, and then ends.

On the other hand, when the process determines (at 1010) that the connection-state data storage does not store an entry for the received data message (i.e., determines that it previously did not process another data message that is part of the same flow as the received data message), the process transitions to 1020. In some embodiments, the connection-state data storage periodically removes old entries that have not matched any received data messages in a given duration of time. Accordingly, in some embodiments, when the process determines (at 1010) that the connection-state data storage does not store an entry for the received data message, the process may have previously identified a service node for the data message's flow, but the matching entry might have been removed from the connection-state data storage.

At 1020, the process determines whether the received data message should be processed locally by the PSN, or remotely by another service node of the SN group. To make this determination, the PSN in some embodiments performs a load balancing operation that identifies the service node for the received data message flow based, based on the load balancing parameter set that the PSN maintains for the SN group at the time that the data message is received. The load balancing parameter set is adjusted in some embodiments (1) based on updated statistic data regarding the traffic load on each service node in the SN group, and (2) based on service nodes that are added to or removed from the SN group.

The process 1000 performs different load balancing operations (at 1020) in different embodiments. In some embodiments, the load balancing operation relies on L2 parameters of the data message flows (e.g., generates hash values form the L2 parameters, such as source MAC addresses, to identify hash ranges that specify service nodes for the generated hash values) to distribute the data messages to service nodes, while in other embodiments, the load balancing operations relies on L3/L4 parameters of the flows (e.g., generates hash values form the L3/L4 parameters, such as five tuple header values, to identify hash ranges that specify service nodes for the generated hash values) to distribute the data messages to service nodes. In yet other embodiments, the load balancing operations (at 1020) use different techniques (e.g., round robin techniques) to distribute the load amongst the service nodes.

When the process determines (at 1020) that the PSN should process the received data message, the process directs (at 1025) a service module of the PSN to perform the SN group's service on the received data message. At 1025, the process 1000 also creates an entry in the flow connection-state data storage to identify the PSN as the service node for processing data messages that are part of the same flow as the received data message. In some embodiments, this entry identifies the PSN and identifies the received data message header values (e.g., five tuple values) that specify the message's flow. After performing (at 1025) the service on the data message, the PSN returns a reply data message (e.g., the processed data message) to the ISS filter that called it, and then ends.

When the process determines (at 1020) that based on its load balancing parameter set, the PSN should not process the received data message, the process identifies (at 1020) another service node in the PSN's SN group to perform the service on the data message. Thus, in this situation, the process directs (at 1030) the message to another service node in the PSN's SN group. To redirect the data messages, the PSN in different embodiments uses different techniques, such as MAC redirect (for L2 forwarding), IP destination network address translation (for L3 forwarding), port address translation (for L4 forwarding), L2/L3 tunneling, etc.

To perform MAC redirect, the process 1000 in some embodiments changes the MAC address to a MAC address of the service node that it identifies at 1020. For instance, in some embodiments, the process changes the MAC address to a MAC address of another SFE port in a port group that contains the SFE port connected with the PSN. More specifically, in some embodiments, the service nodes (e.g., SVMs) of a SN group are assigned ports of one port group that can be specified on the same host or different hosts. In some such embodiments, when the PSN wants to redirect the data message to another service node, it replaces the MAC address of the PSN's port in the data message with the MAC address of the port of the other service node, and then provides this data message to the SFE so that the SFE can forward it directly or indirectly (through other intervening forwarding elements) to the port of the other service node.

Similarly, to redirect the data message to the other service node through IP destination network address translation (DNAT), the PSN replaces the destination IP address in the data message to the destination IP address of the other service node, and then provides this data message to the SFE so that the SFE can forward it directly or indirectly (through other intervening forwarding elements) to the other service node.

To redirect the data message to the other service node through port address translation, the PSN replaces the destination port address in the data message to the destination port address of the other service node, and then uses this new port address to direct the data message to the other service node. In some embodiments, the PSN's network address translation may include changes to two or more of the MAC address, IP address, and port address.

After directing (at 1030) the data message to the other service node, the process creates (at 1035) an entry in the connection-state data storage to identify the other service node as the service node for processing data messages that are part of the same flow as the received data message. In some embodiments, this entry identifies (1) the other service node and (2) the received data message header values (e.g., five tuple values) that specify the message's flow. After performing the service on the data message, the SSN returns a reply data message (e.g., the processed data message) to the ISS filter that called it, and then ends. In some embodiments, the SSN returns the reply data message directly to the ISS filter, while in other embodiments, the SSN returns this reply data message to the ISS filter through the PSN.

The inline service switch of some embodiments statefully distributes the service load to a number of service nodes based on one or more L4+ parameters. Examples of L4+ parameters include session keys, session cookies (e.g., SSL session identifiers), file names, database server attributes (e.g., user name), etc. To statefully distribute the service load among server nodes, the inline service switch in some embodiments establishes layer 4 connection sessions (e.g., a TCP/IP sessions) with the data-message SCNs and the service nodes, so that the switch (1) can examine one or more of the initial payload packets that are exchanged for a session, and (2) can extract and store the L4+ session parameters for later use in its subsequent load balancing operation of a session.

Figure 11:
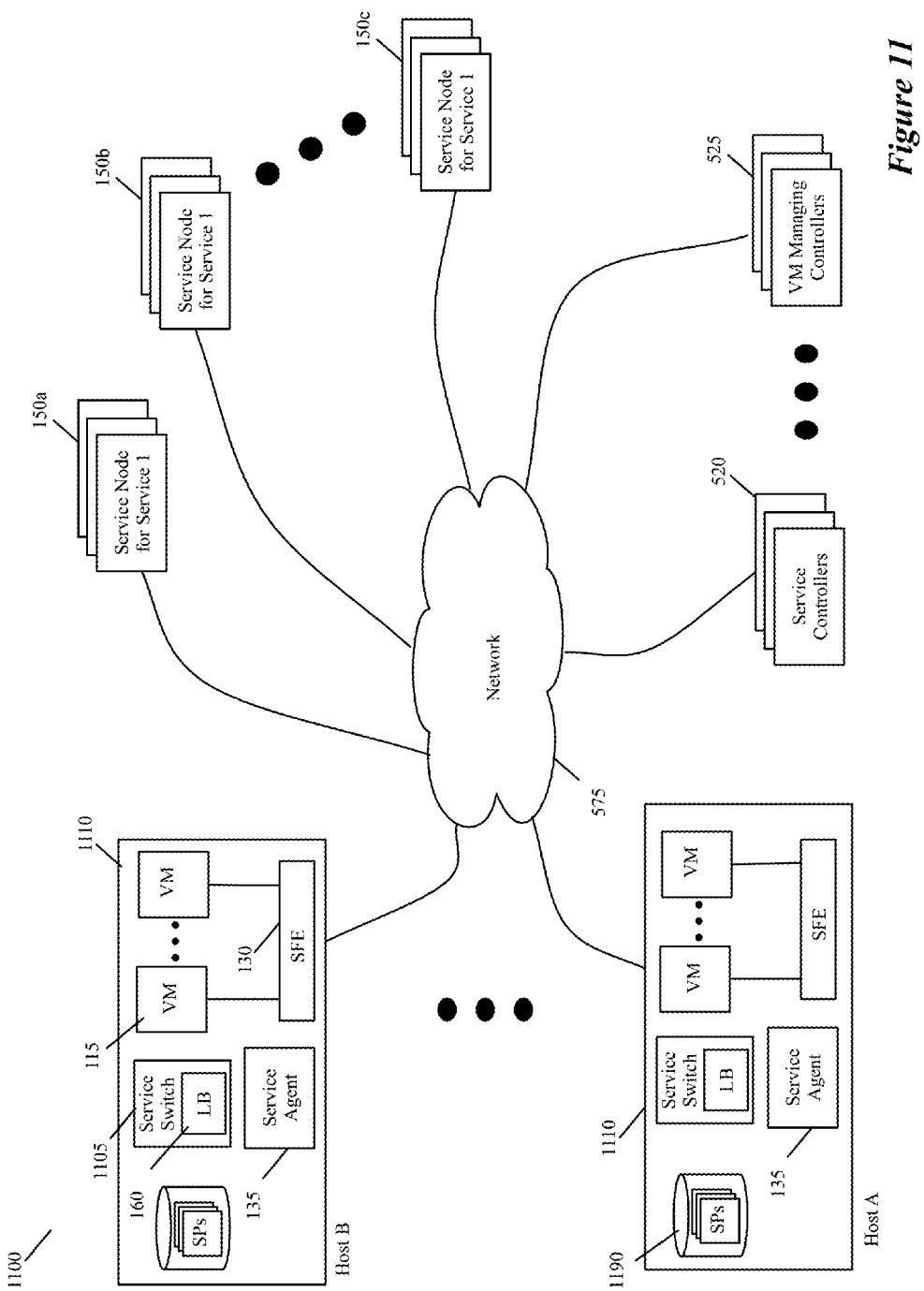
FIG. 11 illustrates an example of a multi-host system with inline service switches that statefully distribute the service load to service nodes.

FIG. 11 illustrates an example of a multi-host system 1100 of some embodiments with the inline service switches 1105 that statefully distributes the service load to a number of service nodes based on one or more L4+ parameters. The system 1100 is identical to the system 100 of FIG. 1, except that its inline service switches 1105 of the hosts 1110 establish layer 4 connection sessions (e.g., a TCP/IP sessions) with their associated VMs and with the service nodes.

Through the layer 4 sessions with its VM and a service node that it selects, an ISS 1105 (1) can examine one or more of the initial payload packets that are exchanged for a session, and (2) can extract and store the L4+ session parameters for later use in its subsequent load balancing operation for its VM. After establishing the L4 sessions with its VM and the service node, the ISS filter (1) receives a data packet from a session end point (i.e., from the VM or the service node), (2) extracts the old packet header, (3) examines the packet payload (i.e., the datagram after the L3 and L4 packet header values) to identify any L4+ session parameter that it needs to extract, (4) extracts any needed L4+ session parameter if one such parameter is found, (5) stores any extracted session parameter (e.g., in the connection storage 1190 on its host 1110), and (6) re-encapsulated the payload with a new packet header before relaying the packet to the other session's end point (i.e., to the service node or the VM). In some embodiments, the new and old packet headers are similar except for specifying different TCP sequence numbers as further described below.

Figure 12:
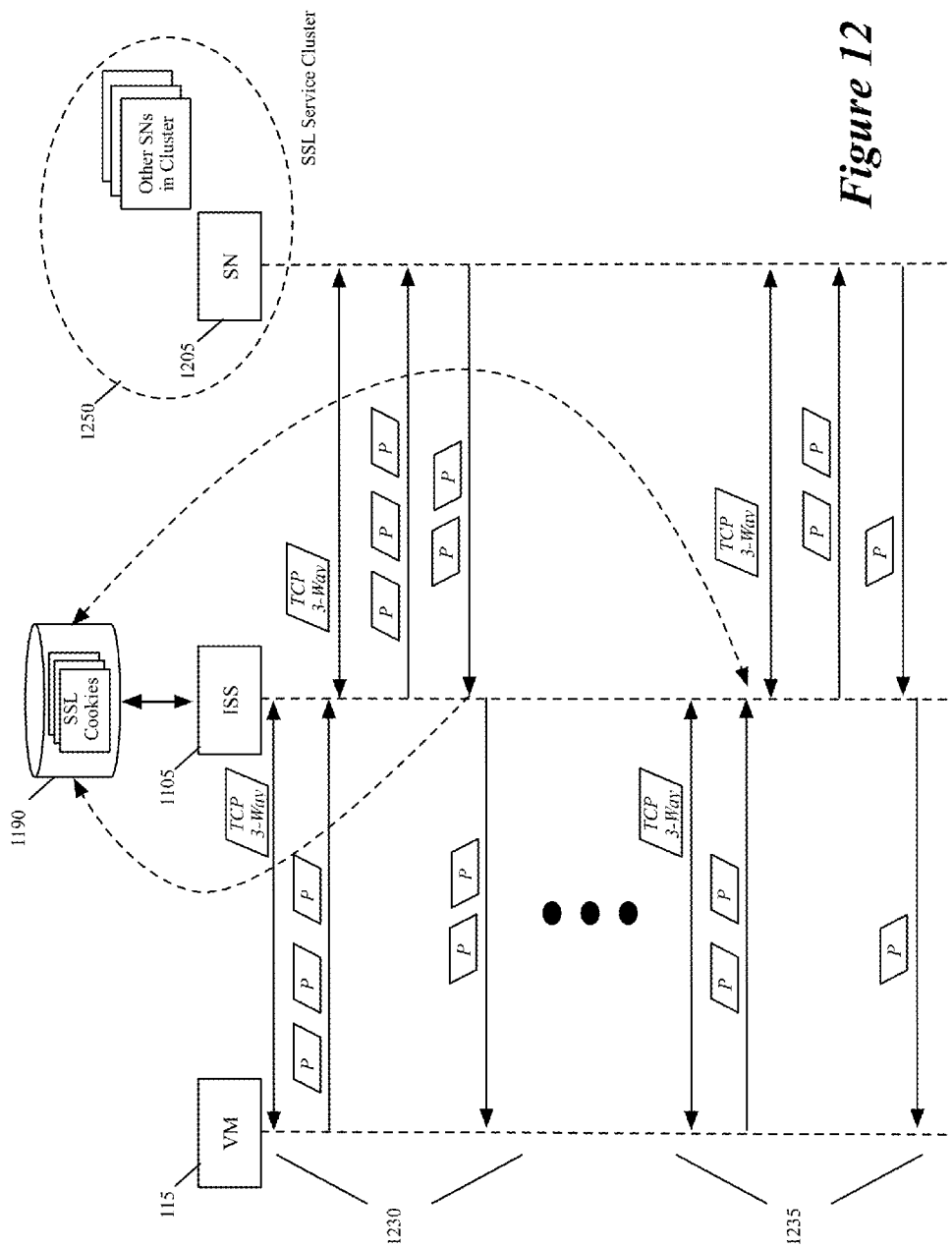
FIG. 12 conceptually illustrates an example of extracting and re-using a session parameter.

FIG. 12 illustrates an ISS 1105 extracting and re-using a session parameter by establishing an L4 connection session with its VM and a service node 1205 of a service cluster 1250. In this example, the service cluster 1250 includes several servers (service nodes) that perform a service (e.g., provide access to secure content) through SSL (secure sockets layer) sessions. Also, in this example, the extracted and re-used session parameters are SSL session cookies.

FIG. 12 presents a messaging diagram that illustrates how the ISS 1105 relays two different sets 1230 and 1235 of SSL packets from its associated VM to a service node 1205. As shown, in both the messaging flows, the ISS 1105 first establishes a TCP session with the VM by performing a 3-way TCP handshake. After establishing the first TCP session with its VM (for the first set of SSL packets 1230), the ISS 1105 examines an initial set of one or more packets that its VM 115 sends and determines that the VM is requesting an SSL service session. The ISS 1105 then determines that the requested SSL service session is a new one as this request is not accompanied by an SSL session cookie.

Hence, the ISS 1105 determines that it has to select a service node for the requested SSL session from the service cluster 1250, and that it has to monitor the packets exchanged between the VM and this service node so that it can record the SSL session cookie for this session. In some embodiments, the ISS 1105 selects the service node 1205 in the cluster based on a set of load balancing criteria that it considers for the service cluster 1250.

After selecting the service node 1205, the ISS 1105 performs a 3-way TCP handshake with the service node 1205 in order to establish an L4 connection session with the service node 1205. Once this session is established, the ISS 1105 starts to relay the packets that it receives from its VM 115 to the service node 1205, and to relay the packets that it receives from the service node 1205 to its VM 115. In relaying the data packets between the VM 115 and the service node 1205, ISS 1105 in some embodiments can adjust the sequence numbers of the relayed data messages to address differences in sequence numbers between the VM and the service node. In some embodiments, the ISS 1105 sends packets to and receives packets from the service node 1205 through a tunnel.

In relaying one or more responsive packets from the service node 1205 to the VM 115, the ISS 1105 identifies in an initial set of packet an SSL session ID that is generated by the service node 1205. This session ID is often referred to as SSL session ID or cookie. After the SSL session ID is created, an SSL session key is generated, e.g., by the VM based on an SSL certificate of the service node. Generation of an SSL session key is computational intensive.

As the ISS 1105 has established an L4 connection with the service node 1205, it can extract the SSL session cookie from the initial set of one or more packets that the service node 1205 sends. As shown, the ISS 1105 stores the SSL session cookie in the connection storage 1190. In some embodiments, the connection storage record that stores this SSL session cookie also includes the identity of the service node 1205 as the service node that generated this cookie. In some embodiments, this record also includes one or more packet header attributes of the current flow (such as source IP, destination IP, destination port, and protocol of the current flow).

In the example illustrated in FIG. 12, the VM stops communicating with the service node for a time period. It then resumes this communication by sending a second set of data packets. Because the VM wants to continue using the same SSL session as before, the VM sends the SSL session cookie that it obtained previously. However, in such situations, it is not unusual for the VM to use a different source port for these new data packet. Because of the different source port, the ISS 1105 initially assumes that the new data packets are for a new flow.

Hence, the ISS 1105 establishes another TCP session with the VM by performing another 3-way TCP handshake. After establishing this second TCP session with its VM, the ISS 1105 examines an initial set of one or more packets sent by its VM 115 and determines this set of packets includes an SSL session cookie. As shown, the ISS 1105 extracts this cookie, compares it with the cookies in its connection storage 1190, identifies the record that stores this cookie (i.e., determines that it has previously stored this cookie) and from this record, identifies service node 1205 as the service node for processing the SSL session associated with this request.

The ISS 1105 then performs another 3-way TCP handshake with the service node 1205 in order to establish another L4 connection session with the service node 1205 because it has determined that this service node is the node that should process the request SSL session. Once this session is established, the ISS 1105 starts to relay packets back and forth between its VM 115 and the service node 1205. By extracting and storing the SSL session cookie when the SSL session was initially established, the ISS 1105 can properly route subsequent data packets from its VM 115 that include this session's cookie to the same service node 1205. This is highly beneficial in that it allows the SSL session to quickly resume, and saves the computational resources from having to generate another session key.

Figure 13:
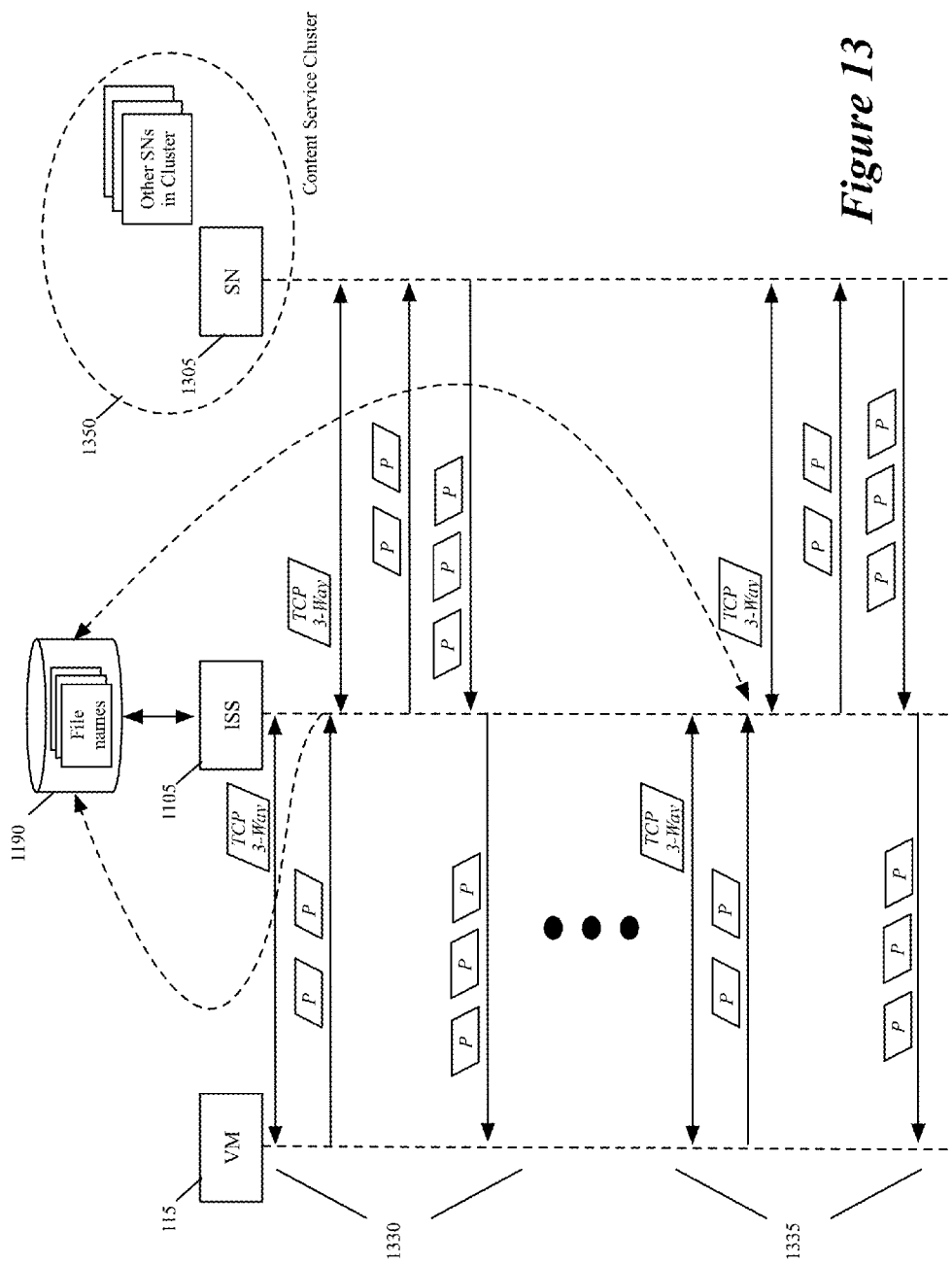
FIG. 13 conceptually illustrates another example of extracting and re-using a session parameter.

As mentioned above, the inline service switches of some embodiments can extract and store different L4+ session parameters for later use in facilitating efficient distribution of service requests from VMs to service nodes in service-node clusters. Other examples include session keys, file names, database server attributes (e.g., user name), etc. FIG. 13 illustrates an example of a file name as the extracted L4+ session parameter. The file name is the name of a piece of content (e.g., image, video, etc.) that is requested by a VM 115 and that is provided by the servers of a service cluster 1350.

In the example of FIG. 13, the VM's ISS 1105 stores the requested file name as part of a first set of content processing messages 1330. As part of these messages, the ISS (1) performs an initial TCP 3-way handshake, (2) receives the VM's initial request, and (3) extracts the file name from the request. In some embodiments, the VM's initial request is in the form of a URL (uniform resource locator), and the ISS 1105 extracts the file name from this URL. The URL often contains the name or acronym of the type of content being requested (e.g., contain .mov, .img, .jpg, or other similar designations that are postscripts that identify the name requested content). The ISS in some embodiments stores the extracted file name in its connection storage 1190 in a record that identifies the service node 1305 that it selects to process this request. From the servers of the cluster 1350, the ISS identifies the service node 1305 by performing a load balancing operation based on a set of load balancing criteria that it processes for content requests that it distributes to the cluster 1350.

Next, the ISS 1105 performs a 3-way TCP handshake with the service node 1305 in order to establish an L4 connection session with the service node 1305. Once this session is established, the ISS 1105 relays the content request to the service node 1305. In relaying this request to the service node 1305, ISS 1105 in some embodiments can adjust the sequence numbers of the relayed data packets to address differences in sequence numbers between the VM and the service node 1305. In some embodiments, the ISS 1105 sends packets to and receives packets from the service node 1305 through a tunnel.

The ISS 1105 then receives one or more responsive packets from the service node 1305 and relays these packets to the VM 115. This set of packets includes the requested content piece. In some embodiments, the ISS 1105 creates the record in the connection storage 1190 to identify the service node 1305 as the server that retrieved the requested content piece only after receiving the responsive packets from this server.

In some embodiments, the service node 1305 directly sends its reply packets to the VM 115. In some of these embodiments, the ISS 1105 provides a TCP sequence number offset to the service node, so that this node can use this offset in adjusting its TCP sequence numbers that it uses in its reply packets that respond to packets from the VM 115. In some embodiments, the ISS 1105 provides the TCP sequence number offset in the encapsulating tunnel packet header of a tunnel that is used to relay packets from the ISS to the service node 1305. Also, in some embodiments, the inline service switch 1105 is configured to, or is part of a filter architecture that is configured to, establish the L4 connection session for its associated VM. In these embodiments, the ISS 1105 would not need to establish a L4 connection session with its VM in order to examine L4 parameters sent by the VM.

A time period after its initial request for the content piece, the VM 115 starts a second set of content processing messages 1335 by requesting the same content piece. In such situations, it is not unusual for the VM to use a different source port for these new data packet. Because of the different source port, the ISS 1105 initially assumes that the new data packets are for a new flow. Hence, the ISS 1105 establishes another TCP session with its VM by performing a 3-way TCP handshake. After establishing this second TCP session with its VM, the ISS 1105 examines an initial set of one or more packets sent by its VM 115 and determines this set of packets includes a content request. ISS 1105 then extracts the file name from the URL of this request, compares this file name with the file names stored in its connection storage 1190, and determines that it has previously processed a request for this content piece by using service node 1305.

Accordingly, the ISS 1105 performs another 3-way TCP handshake with the service node 1305 in order to establish another L4 connection session with the service node 1305. Once this session is established, the ISS 1105 relays the content request to this service node, and after obtaining the responsive data packets, relays them to its VM.

This approach is highly beneficial in that it saves the service cluster's resources from having to obtain the same piece of content twice. In other words, going to the same service node is efficient as the service node 1305 probably still has the requested content in its cache or memory. When multiple ISS 1105 on the same host share the same connection storage, this approach is also beneficial in that it allows one ISS of one VM to go to the same service node as the ISS of another VM when both VMs requested the same piece of content within a particular time period.

Figure 14:
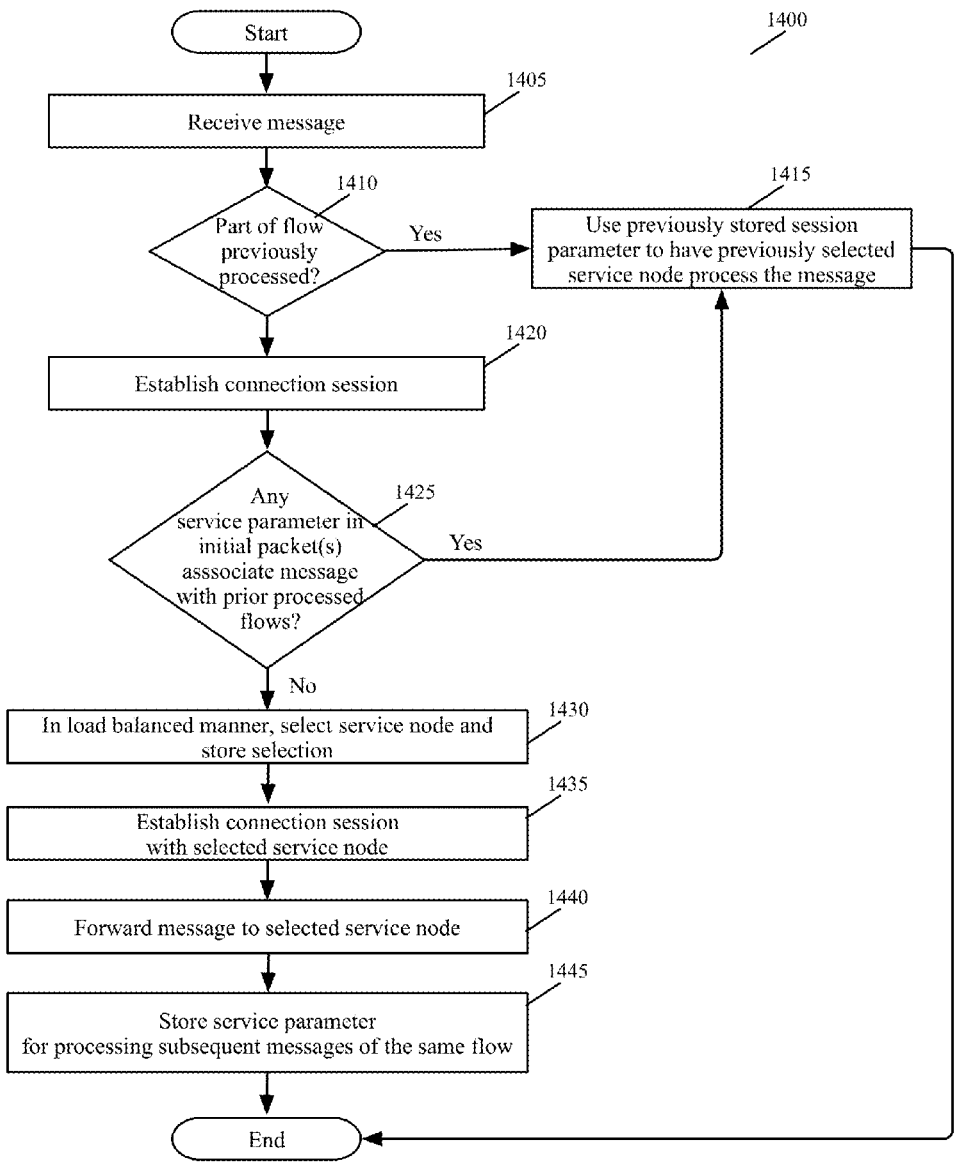
FIG. 14 conceptually illustrates a process of some embodiments for processing a service request in a sticky manner from an associated VM.

FIG. 14 illustrates a process 1400 that an ISS 1105 of a VM 115 performs to process a service request in a sticky manner from an associated VM. In performing this process, the ISS 1105 (1) determines whether the request is associated with a service request previously processed by a service node of a service-node cluster, and (2) if so, directs the service request to the service node that was previously used. The ISS 1105 determines whether the request is associated with a previously processed request by examining L4+ session parameters that it stored for previous requests in its connection storage 1190.

The process 1400 starts when the ISS 1105 receives a data message sent by its associated VM. In some embodiments, the ISS 1105 is deployed in the VM's egress datapath so that it can intercept the data messages sent by its VM. In some embodiments, the ISS 1105 is called by the VM's VNIC or by the SFE port that communicatively connects to the VM's VNIC. In some embodiments, the received data message is addressed to a destination address (e.g., destination IP or virtual IP address) associated with a service node cluster. Based on this addressing, the ISS ascertains (at 1405) that the data message is a request for a service that is performed by the service nodes of the cluster.

At 1410, the process determines whether the data message is part of a data message flow for which the process has processed other data messages. In some embodiments, the process makes this determination by examining its connection storage 1190, which stores records of the data message flows that it has recently processed as further described below by reference to 1445. Each record stores one or more service parameters that the process previously extracted from the previous data messages that it processed. Examples of such session parameters include session cookies, session keys, file names, database server attributes (e.g., user name), etc. Each record also identifies the service node that previously processed data messages that are part of the same flow. In some embodiments, this record also stores the flow's identifier (e.g., the five tuple identifier). In addition, the connection storage is hash addressable (e.g., locations in the connection storage are identified based on a hash of the flow's identifier) in some embodiments.

When the process determines (at 1410) that it has previously processed a data message from the same flow as the received data message, it transitions to 1415. At 1415, the process retrieves from the connection storage 1190 the identity of the service node that it used to process previous data messages of the same flow, and forwards the received data message to the identified service node to process. In some cases, at 1415, the process also (1) retrieves the previously stored session parameter(s) (e.g., session cookie) for the data message's flow from the connection storage 1190, and (2) forwards the retrieved parameter(s) to the identified service node so that this node can use the parameter(s) to process the forwarded data message. Instead of forwarding the retrieved service parameter(s) to the service node, the process 1400 in some embodiments uses the retrieved service parameter(s) to perform an operation on the received data message, before forwarding the data message to the identified service node. Also, in some embodiments, the process provides additional context information (e.g., Tenant ID, Network ID, etc.), which cannot be encoded in the tunnel key. After 1415, the process 1400 ends.

When the process determines (at 1410) that it has not previously processed a data messages from the same data message flow, the process establishes (at 1420) an L4 session with the VM (e.g., by performing a three-way TCP handshake with the VM). After establishing the L4 session with its VM, the process determines (at 1425) whether an initial set of one or more packets sent by its VM contain one or more L4 service parameters that the process can use to determine whether it has previously processed a similar service request. Again, examples of such session parameters include session cookies, session keys, file names, database server attributes (e.g., user name), etc.

When the set of packets includes one or more such L4 service parameters, the process determines (at 1420) whether the connection storage 1190 contains a record for the identified L4 service parameter(s). If so, the process transitions to 1415 to forward the data message to the record's identified service node. In some embodiments, the process 1400 also performs other operations at 1415, as described above. The process 1400 can transition from either 1410 or 1420 to 1415, because the process can determine that the same session record is applicable based either on outer packet header values (e.g., L2, L3 and L4 values) of one message flow, or on inner packet values (e.g., L4+ parameters) of another message flow. The inner packet values might match a session record when the VM uses a different source port for a service session that follows an earlier related service session, as described above by reference to FIG. 12. This would also result when the VM requests the same file and the file name is used to identify the same service node, as described above by reference to FIG. 13.

When the process 1400 determines that the examined packets do not include an L4+ service parameter for which the connection storage stores a record that identifies a service node as the service node for processing the VM's service request, the process uses (at 1430) the load balancer of the ISS to select a service node in a service node cluster to process the service request from the VM. To select service nodes in a load-balance manner, the process 1400 uses a service rule that matches the received message flow attributes. The service rule specifies a set of service nodes, and a set of load-balancing criteria (e.g., weight values) for each of the rule's specified service nodes. Different service rules in some embodiments specify different service action sets that have to be performed, and the load-balancing criteria for each service action of the rule specify the criteria for distributing data messages amongst the service nodes for that action.

After selecting (1430) a service node for the data message, the process establishes (at 1435) an L4 session with the service node (e.g., through a three-way TCP handshake with the service node), because it soft terminated the session with the VM. Next, at 1440, the process uses this connection session to forward the data messages that it receives from the VM to the selected service node.

Through this connection, the process also receives responsive data messages from the selected service node, and it forwards these received data messages to the VM through its connection session with the VM. In relaying the data messages back and forth, the process in some embodiments adjusts the TCP sequence numbers of the data messages, as described above. In some embodiments, the process exchanges messages with the selected service node through a tunnel. Hence, in these embodiments, the process encapsulated the data messages that it relays to the service node with a tunnel header, and it removes this tunnel header from the data messages that it passes from the service node to the VM. As the process 1400 relays data messages to the service node, it updates in some embodiments the statistics that it maintains in the ISS STAT storage to keep track of the data messages that it is directing to different service nodes.

At 1445, the process stores in the connections storage 1190 one or more L4+ parameters that it extracts from the data messages that it relays between the VM and selected service node. In some embodiments, the process stores the L4+ parameter set in a record that identifies the selected service node, as mentioned above. By storing the selected service node's identity for the extracted L4+ parameter set, the process can later re-use the selected service node for processing data messages that related to the same L4+ parameter set. In some embodiments, the record created at 1445 also stores the flow identifier of the data message received at 1405, so that this record can also be identified based on the outer packet header attributes of the flow. After 1445, the process ends.

The inline service switches of the embodiments described above by reference to FIGS. 12-14 select service nodes in a service node cluster, and relay data messages to the selected service nodes. However, as described above, the inline service switches of some embodiments select service node clusters in a group of service node clusters, and forward data messages to the selected clusters. One of ordinary skill will realize that the inline service switches of some embodiments implement sticky service request processing by forwarding data messages to service clusters (that perform the same service) in a sticky manner. In other words, an inline switch in these embodiments stores L4+ session parameters that allow this switch to forward the same or similar service session requests to the same service node clusters in a cluster group that performs the same service.

Figure 15:
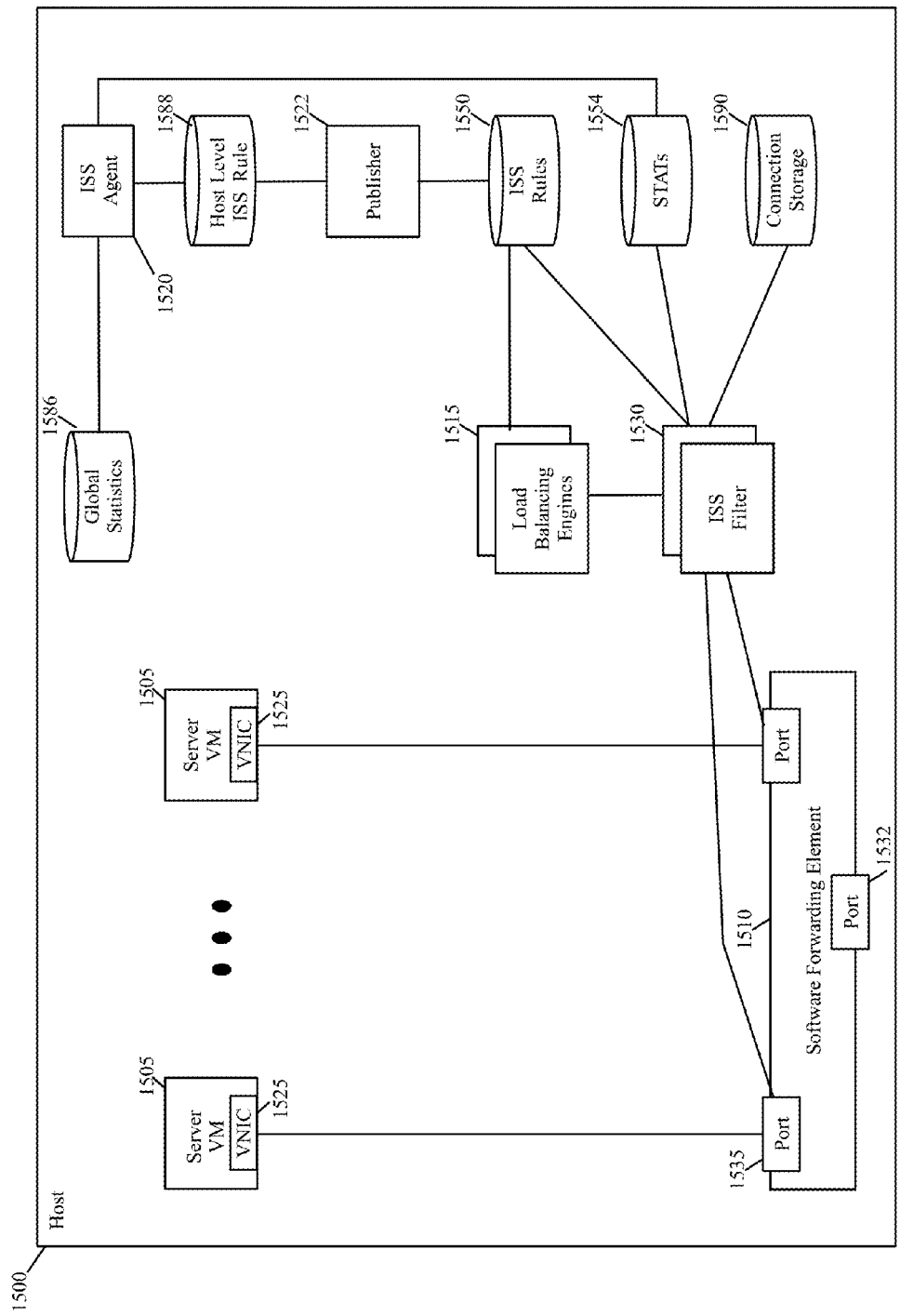
FIG. 15 illustrates a more detailed architecture of a host computing device

FIG. 15 illustrates a more detailed architecture of a host 1500 that executes the ISS filters of some embodiments of the invention. As shown, the host 1500 executes multiple VMs 1505, an SFE 1510, multiple ISS filters 1530, multiple load balancers 1515, an agent 1520, and a publisher 1522. Each ISS filter has an associated ISS rule storage 1550, a statistics (STAT) data storage 1554, and a connection state storage 1590. The host also has an aggregated (global) statistics data storage 1586.

In some embodiments, the VMs execute on top of a hypervisor, which is a software layer that enables the virtualization of the shared hardware resources of the host. In some of these embodiments, the hypervisors provide the ISS filters in order to support inline service switching services to its VMs.

The SFE 1510 executes on the host to communicatively couple the VMs of the host to each other and to other devices outside of the host (e.g., other VMs on other hosts) through one or more forwarding elements (e.g., switches and/or routers) that operate outside of the host. As shown, the SFE 1510 includes a port 1532 to connect to a physical network interface card (not shown) of the host, and a port 1535 that connects to each VNIC 1525 of each VM.

In some embodiments, the VNICs are software abstractions of the physical network interface card (PNIC) that are implemented by the virtualization software (e.g., by a hypervisor). Each VNIC is responsible for exchanging data messages between its VM and the SFE 1510 through its corresponding SFE port. As shown, a VM's ingress datapath for its data messages includes the SFE port 1532, the SFE 1510, the SFE port 1535, and the VM's VNIC 1525. A VM's egress datapath for its data messages involves the same components but in the opposite direction, specifically from the VNIC 1525, to the port 1535, to the SFE 1510, and then to the port 1532.

Through its port 1532 and a NIC driver (not shown), the SFE 1510 connects to the host's PNIC to send outgoing packets and to receive incoming packets. The SFE 1510 performs message-processing operations to forward messages that it receives on one of its ports to another one of its ports. For example, in some embodiments, the SFE tries to use header values in the VM data message to match the message to flow based rules, and upon finding a match, to perform the action specified by the matching rule (e.g., to hand the packet to one of its ports 1532 or 1535, which directs the packet to be supplied to a destination VM or to the PNIC). In some embodiments, the SFE extracts from a data message a virtual network identifier (VNI) and a MAC address. The SFE in these embodiments uses the extracted VNI to identify a logical port group, and then uses the MAC address to identify a port within the port group. In some embodiments, the SFE 1510 is a software switch, while in other embodiments it is a software router or a combined software switch/router.

The SFE 1510 in some embodiments implements one or more logical forwarding elements (e.g., logical switches or logical routers) with SFEs executing on other hosts in a multi-host environment. A logical forwarding element in some embodiments can span multiple hosts to connect VMs that execute on different hosts but belong to one logical network. In other words, different logical forwarding elements can be defined to specify different logical networks for different users, and each logical forwarding element can be defined by multiple SFEs on multiple hosts. Each logical forwarding element isolates the traffic of the VMs of one logical network from the VMs of another logical network that is serviced by another logical forwarding element. A logical forwarding element can connect VMs executing on the same host and/or different hosts.

The SFE ports 1535 in some embodiments include one or more function calls to one or more modules that implement special input/output (I/O) operations on incoming and outgoing packets that are received at the ports. One of these function calls for a port is to an ISS filter 1530. In some embodiments, the ISS filter performs the service switch operations on outgoing data messages from the filter's VM. In the embodiments illustrated in FIG. 15, each port 1535 has its own ISS filter 1530. In other embodiments, some or all of the ports 1535 share the same ISS filter 1530 (e.g., all the ports on the same host share one ISS filter, or all ports on a host that are part of the same logical network share one ISS filter).

Examples of other I/O operations that are implemented through function calls by the ports 1535 include firewall operations, encryption operations, etc. By implementing a stack of such function calls, the ports can implement a chain of I/O operations on incoming and/or outgoing messages in some embodiments. In the example illustrated in FIG. 15, the ISS filters are called from the ports 1535 for a data message transmitted by a VM. Other embodiments call the ISS filter from the VM's VNIC or from the port 1532 of the SFE for a data message sent by the VM, or call this filter from the VM's VNIC 1525, the port 1535, or the port 1532 for a data message received for the VM (i.e., deploy the service operation call along the ingress path for a VM).

For the data messages that are sent by its associated VM, an ISS filter 1530 enforces one or more service rules that are stored in the ISS rule storage 1550. These service rules implement one or more service policies. Based on the service rules, the ISS filter (1) determines whether a sent data message should be processed by one or more service nodes or clusters, and (2) if so, selects a service node or cluster for processing the data message and forwards the data message to the selected node or cluster (e.g., through a tunnel).

In some embodiments, each service rule in the service rule storage 1550 has (1) an associated set of data message identifiers (e.g., packet header values), (2) a set of one or more actions, (3) for each action, a set of service nodes or service node clusters that perform the action, and (4) for each action, a set of load balancing criteria for select a service node or cluster in the rule's set of service node or service node clusters. As further described below, a rule in some embodiments can identify a service node or cluster by providing an identifier for the tunnel connected to the service node or cluster (e.g., from the host, or the SFE, or the ISS filter).

After being called to process a data message, the ISS filter 1530 in some embodiments determines whether the received data message's identifiers (e.g., five tuples) match the data message identifiers of a service rule in its service rule storage. When the received data message's header values do not match the rule-matching identifier of one or more service rules in the service rule storage, the ISS filter 1530 informs the port 1535 that it has completed processing of the data message, without performing any service on the data message. The ISS filter also stores a record of this decision in its connection storage 1590. This record identifies the data message flow identifier (e.g., its five tuple identifier) and identifies that no service action needs to be performed for this data message flow. This record can be used for quick processing of subsequent data messages of the same flow.

When a data message's header values matches a service rule, the ISS filter performs the set of actions specified with the matching service rule. When the set of actions includes more than one action, the ISS filter performs the service actions sequentially. In some embodiments, a service action of a matching service rule is performed by a service node of a SN group or a SN cluster of a SN cluster group. Accordingly, to perform such a service action, the ISS filter selects a service node or cluster for processing the data message and forwards the data message to the selected node or cluster.

In some embodiments, the ISS filter 1530 forwards the data message to the selected node or cluster through a tunnel. In other embodiments, the ISS filter 1530 connects to some service nodes/clusters through tunnels, while not using tunnels to connect to other service nodes/clusters. For instance, in some embodiments, the ISS filter 1530 might use L3 or L4 destination network address translation (DNAT), or MAC redirect, to forward data messages to some of the service nodes. Also, in some embodiments, one or more service nodes might be executing on the same host computer 1500 as the ISS filter 1530, and in these embodiments the ISS filter 1530 directs the data messages to these service nodes through DNAT, MAC redirect or some other forwarding mechanism that is part of the filter framework of some embodiments. In some embodiments, service rules have identifiers that specify different re-direction mechanisms, as one rule can, or different rules can, identify different service nodes or SN clusters that are accessible through different re-direction mechanisms.

When the ISS filter 1530 uses a tunnel to send a data message to a service node or cluster, the ISS filter in some embodiments encapsulates the data message with a tunnel packet header. This packet header includes a tunnel key in some embodiments. In other embodiments, the ISS filter 1530 has another I/O chain filter encapsulate the data messages with tunnel packet headers.

In some embodiments, the ISS filter 1530 has to establish an L4 connection session with the service node. In some of embodiments, the ISS filter also has to establish an L4 connection session with its VM. To establish an L4 connection session, the ISS filter performs a three-way TCP/IP handshake with the other end of the connection (e.g., with the service node or VM) in some embodiments.

As mentioned above, a matching service rule in some embodiments specifies a set of load balancing criteria for each set of service nodes or clusters that perform a service action specified by the rule. In these embodiments, the ISS filter 1530 has its associated load balancer 1550 use the rule's specified load balancing criteria to select a service node from the specified SN group, or a service cluster from the specified SN cluster group.

The load balancer distributes the data message load for performing a service action to the service nodes or the SN clusters in a load balanced manner specified by the load balancing criteria. In some embodiments, the load balancing criteria are weight values associated with the service node or SN clusters. One example of using weight values to distribute new data message flows to service nodes in a load balancing way was described above.

In some embodiments, the weight values are generated and adjusted by the agent 1520 and/or a controller set based on the load statistics. In some embodiments, each ISS filter 1530 has its own load balancer 1515, while in other embodiments, multiple ISS filters 1530 share the same load balancer 1525 (e.g., ISS filters of VMs that are part of one logical network use one load balancer 1515 on each host).

The ISS filter 1530 stores in the connection state storage 1590 data records that maintain connection state for data message flows that the ISS filter 1530 has previously processed. This connection state allows the ISS filter 1530 to distribute data messages that are part of the same flow statefully to the same content server. In some embodiments, each record in the connection storage corresponds to a data message flow that the ISS filter 1530 has previously processed.

Each record stores a description of the set of service rules that have to be applied to the flow's data messages or has a reference (e.g., a pointer) to this description. In some embodiments, when the operation of the service rule set requires the data message to be dropped, the connection-storage record also specifies this action, or specifies this action in lieu of the service rule description. Also, when no service has to be performed for data messages of this flow, the connection-storage record in some embodiments indicates that the ISS should allow the received data message to pass along the VM's egress datapath. In some embodiments, this record stores the flow's identifier (e.g., the five tuple identifiers). In addition, the connection storage is hash addressable (e.g., locations in the connection storage are identified based on a hash of the flow's identifier) in some embodiments. When the ISS filter 1530 stores an L4+ session parameter, the ISS filter 1530 in some of these embodiments stores this parameter in the connection state storage 1590.

In some embodiments, each time a ISS filter directs a message to a service node or SN cluster, the ISS filter updates the statistics that it maintains in its STAT data storage 1554 for the data traffic that it relays to the service nodes and/or clusters. Examples of such statistics include the number of data messages (e.g., number of packets), data message flows and/or data message bytes relayed to each service node or cluster. In some embodiments, the metrics can be normalized to units of time, e.g., per second, per minute, etc.

In some embodiments, the agent 1520 gathers (e.g., periodically collects) the statistics that the ISS filters store in the STAT data storages 1554, and relays these statistics to a controller set. Based on statistics that the controller set gathers from various agents 1520 of various hosts, the controller set (1) distributes the aggregated statistics to each host's agent 1520 so that each agent can define and/or adjust the load balancing criteria for the load balancers on its host, and/or (2) analyzes the aggregated statistics to specify and distribute some or all of the load balancing criteria to the hosts. In some embodiments where the controller set generates the load balancing criteria from the aggregated statistics, the controller set distributes the generated load balancing criteria to the agents 1520 of the hosts.

In the embodiments, where the agent 1520 receives new load balancing criteria or new ISS rules from the controller set, the agent 1520 stores these criteria or new rules in the host-level rule storage 1588 for propagation to the ISS rule storages 1550. In the embodiment where the agent 1520 receives aggregated statistics from the controller set, the agent 1520 stores the aggregated statistics in the global statistics data storage 1586. In some embodiments, the agent 1520 analyzes the aggregated statistics in this storage 1586 to define and/or adjust the load balancing criteria (e.g., weight values), which it then stores in the rule storage 1588 for propagation to the ISS rule storages 1550. The publisher 1522 retrieves each service rule and/or updated load balancing criteria that the agent 1520 stores in the rule storage 1588, and stores the retrieved rule or criteria in the ISS rule storage 1550 of each ISS filter that needs to enforce this rule or criteria.

The agent 1520 not only propagates service rule updates based on newly received aggregated statistics, but it also propagates service rules or updates service rules based on updates to SN group or cluster group that it receives from the controller set. Again, the agent 1520 stores such updated rules in the rule data storage 1588, from where the publisher propagates them to ISS rule storages 1550 of the ISS filters 1530 that need to enforce these rules. In some embodiments, the controller set provides the ISS agent 1520 with high level service policies that the ISS agent converts into service rules for the ISS filters to implement. In some embodiments, the agent 1520 communicates with the controller set through an out-of-band control channel.

Some embodiments provide a controller-driven method for reconfiguring the application or service layer deployment in a datacenter. In some embodiments, the controller set 120 provides a host computer with parameters for establishing several tunnels, each between the host computer and a service node that can be in the same datacenter as the host computer or can be at a different location as the datacenter. The provided tunnel-establishing parameters include tunnel header packet parameters in some embodiments. These parameters in some embodiments also include tunnel keys, while in other embodiments, these parameters include parameters for generating the tunnel keys. Tunnel keys are used in some embodiments to allow multiple different data message flows to use one tunnel from a host to a service node. In some embodiments, establishing a tunnel entails configuring modules at the tunnel endpoints with provisioned tunnel parameters (e.g., tunnel header parameters, tunnel keys, etc.).

In some embodiments, the tunnels connect the host computer with several service nodes of one or more service providers that operate in the same datacenter or outside of the datacenter. In some deployments, only one tunnel is established between each host and a service node and all ISS filters on the host use the same tunnel for relaying data messages to the service node. This is done to reduce the number of tunnels. This approach can be viewed as establishing one tunnel between the host's SFE and the service node. In other deployments, more than one tunnel is established between a host and a service node. For instance, in some deployments, one tunnel is established between each ISS filter on the host and the service node.

In some embodiments, the controller set 120 define data-message distribution rules for SCNs in the datacenter, and push these rules to the ISS filters of the SCNs. The ISS filters then distribute the data messages to the data compute nodes (DCNs) that are identified by the distribution rules as the DCNs for the data messages. In other embodiments, the controller set 120 define data-message distribution policies for SCNs in the datacenter, and push these policies to the hosts that execute the SCNs. The hosts then generate distribution rules from these policies and then configure their ISS filters based on these policies.

In some embodiments, distribution rule includes (1) a rule identifier that is used to identify data message flows that match the rule, and (2) a set of service actions for data message flows that match the rule. In some embodiments, the rule identifier can be defined in terms of group identifiers (such as virtual IP addresses (VIPs)) or metadata tags assigned by application level gateways.

In some embodiments, each service action of a rule is defined by reference an identifier that identifies a set of service nodes for performing the service action. Some rules can specify two or more service actions that are performed by two or more sets of service nodes of two or more service providers. In some embodiments, each service-node set is a service node cluster and is defined in the rule by reference to a set of tunnel identifiers (1) that identifies one tunnel to the service node cluster, or (2) that identifies one tunnel to each service node in the service-node cluster.

For each service action, a distribution rule also includes a set of selection criteria for each set of service action of the rule. In some embodiments, the selection criteria set includes one or more criteria that are dynamically assessed (e.g., based on the identity of SCNs executing on the host, etc.). In some embodiments, the selection criteria set is a load balancing criteria set that specifies criteria for distributing new data message flows amongst the service nodes that perform the service action.

This controller-driven method can seamlessly reconfigure the application or service layer deployment in the datacenter without having to configure the SCNs to use new group addresses or tags (e.g., new VIPs). The controller set only needs to provide the inline switches with new distribution rules that dictate new traffic distribution patterns based on previously configured group addresses or tags. In some embodiments, the seamless reconfiguration can be based on arbitrary packet header parameters (e.g., L2, L3, L4 or L7 parameters) that are used by the SCNs. In other words, these packet header parameters in some cases would not have to include group addresses or tags.

As mentioned above, the inline switches in some embodiments can be configured to distribute data messages based on metadata tags that are associated with the packets, and injected into the packets (e.g., as L7 parameters) by application level gateways (ALGs). For example, as ALGs are configured to inspect and tag packets as the packets enter a network domain (e.g., a logical domain), the controller set in some embodiments is configured to push new distribution policies and/or rules to the inline switches that configure these switches to implement new application or service layer deployment in the network domain.

Figure 16:
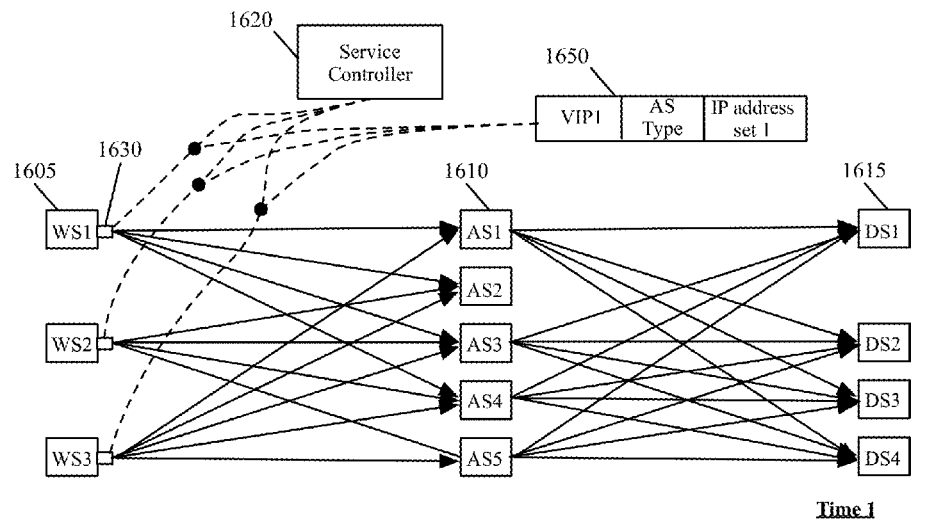
FIG. 16 illustrates an example of a controller re-configuring the application layer deployment.
Figure 16:
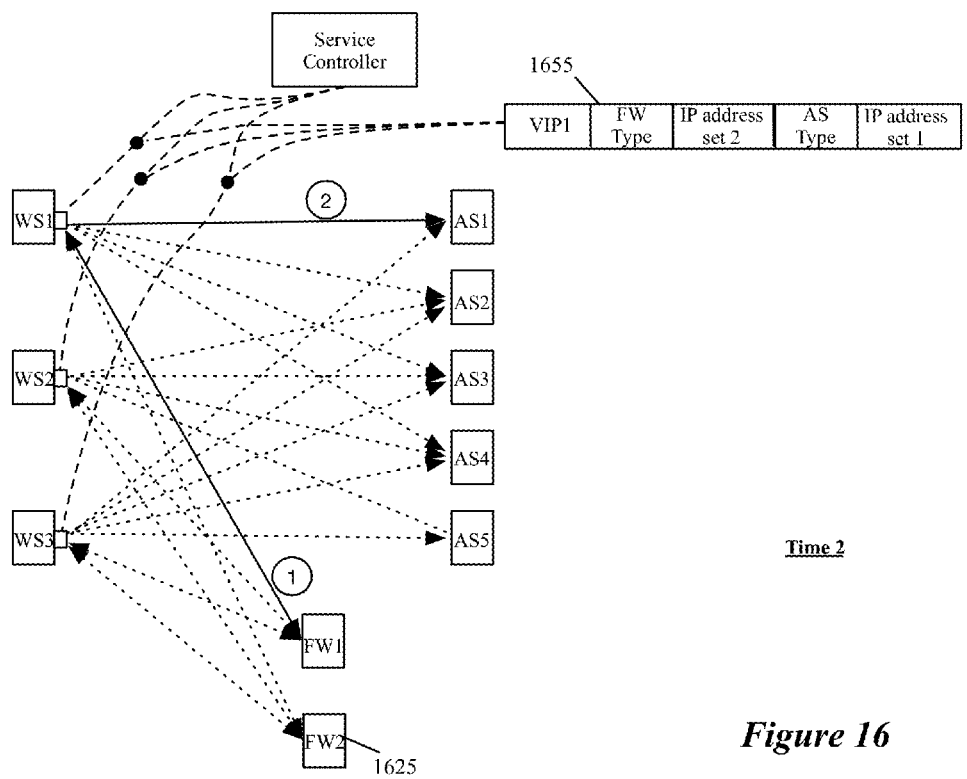

The controller-driven method of some embodiments will now be described by reference to FIGS. 16-19. FIG. 16 illustrates an example of a controller re-configuring the application layer deployment to insert a firewall service operation between a set of webservers 1605 and a set of application servers 1610. This figure illustrates a datacenter that implement a three-server layer deployment, in which the first layer includes one or more webservers 1605, the second layer includes one or more application servers 1610, and the third layer includes one or more database servers 1615.

As shown, a controller 1620 initially configures the inline switches 1630 of the webservers 1610 with message distribution rules that direct the switches to forward received packet flows that have a particular VIP (VIP1) as their destination IP address to the application servers. FIG. 16 illustrates an example of this rule 1650. As shown, this rule specifies VIP1 as a flow-matching attribute, AS (application server) type as the action type to perform, and the IP address set 1 as the set of IP addresses of the application servers 1610.

A time period after initially configuring the inline switches 1630, the controller 1620 re-configures these switches 1630 with new packet distribution rules 1655 that direct the switches (1) to first forward such a packet flow (i.e., a packet flow with VIP1 for their destination IP address) to a set of firewall servers 1625, and then (2) if the firewall servers do not direct the webservers to drop the packet flow, to forward the packets of this packet flow to the application servers 1610. As shown, each rule 1655 specifies (1) VIP1 as a flow-matching attribute, (2) FW (firewall) type as the first action's type, (3) the IP address set 2 as the set of IP addresses of the firewall servers 1625, (4) AS (application server) type as the second action's type, and (5) the IP address set 1 as the set of IP addresses of the application servers 1610.

In some embodiments, the new packet distribution rule that the controller 1620 provides to the webservers switches 1630 specifies, for flows with VIP1 destination IP, a service policy chain that (1) first identifies a firewall operation and then (2) identifies an application-level operation. This new rule replaces a prior rule that only specifies for flows with VIP1 destination IP the application-level operation.

In some embodiments, for each operation that the rule specifies, the rule includes, or refers to, (1) identifiers (e.g., IP addresses, tunnel identifiers, etc.) of a set of servers that perform that operation, and (2) load balancing criteria for distributing different flows to different servers in the set. In directing the data messages to the firewalls 1625, the inline switches perform load-balancing operations based on the load balancing criteria to spread the packet flow load among the firewalls 1625. In some embodiments, the controller 1620 configures the inline switches 1630 with multiple different rules for multiple different VIPs that are associated with multiple different service policy sets.

Figure 17:
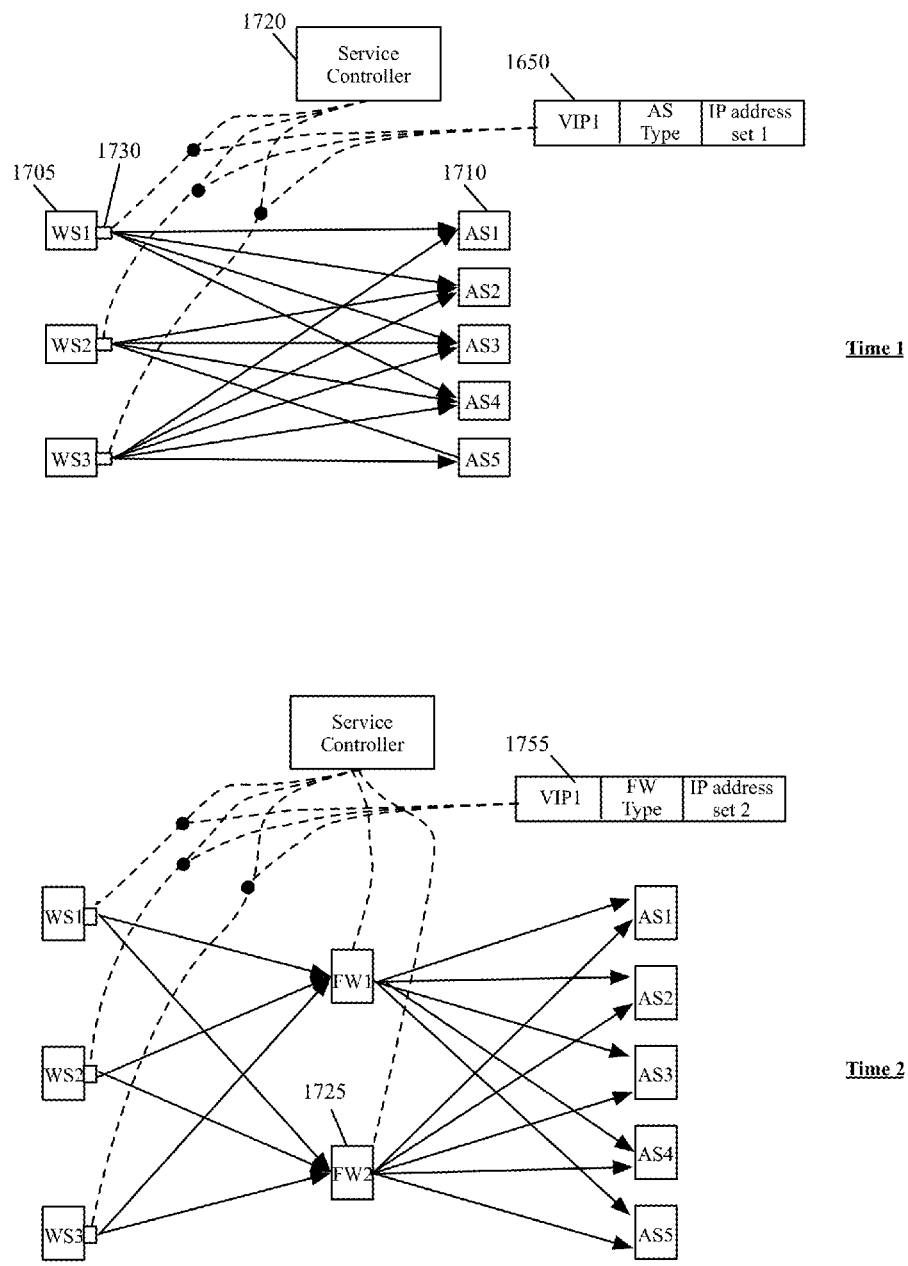
FIG. 17 illustrates another example of a controller re-configuring the application layer deployment.

In the example of FIG. 16, the controller re-configures the webservers 1605 (1) to direct a packet flow with VIP1 as the destination IP addresses to the firewall servers, and then after receiving the firewall servers assessment as to whether the packet flow should not be dropped, (2) to forward the packets for this flow to the application server. FIG. 17 illustrates that in other embodiments, the controller 1720 (1) re-configures the inline switches 1730 of the webservers 1705 to forward all packets with the destination IP address VIP1 to the firewall servers 1725, and (2) configures the firewall servers 1725 to forward these packets directly to the application servers 1710 if the firewall servers 1725 determine that the packets should not be dropped this approach.

As shown, the controller 1720 initially configures the inline switches with the rule 1650, which was described above. The controller then re-configures the inline switches with the rule 1755, which specifies (1) VIP1 as a flow-matching attribute, (2) FW (firewall) type as the action type, and (3) the IP address set 2 as the set of IP addresses of the firewall servers 1725. In the example of FIG. 17, the controller then configures the firewall servers 1725 to forward any passed-through packets directly to the application servers 1710. In some of these embodiments, the controller configures the firewall servers by configuring the inline switches that are placed in the egress paths of the firewall servers to forward the firewall processed packets to the application servers 1710.

Figure 18:
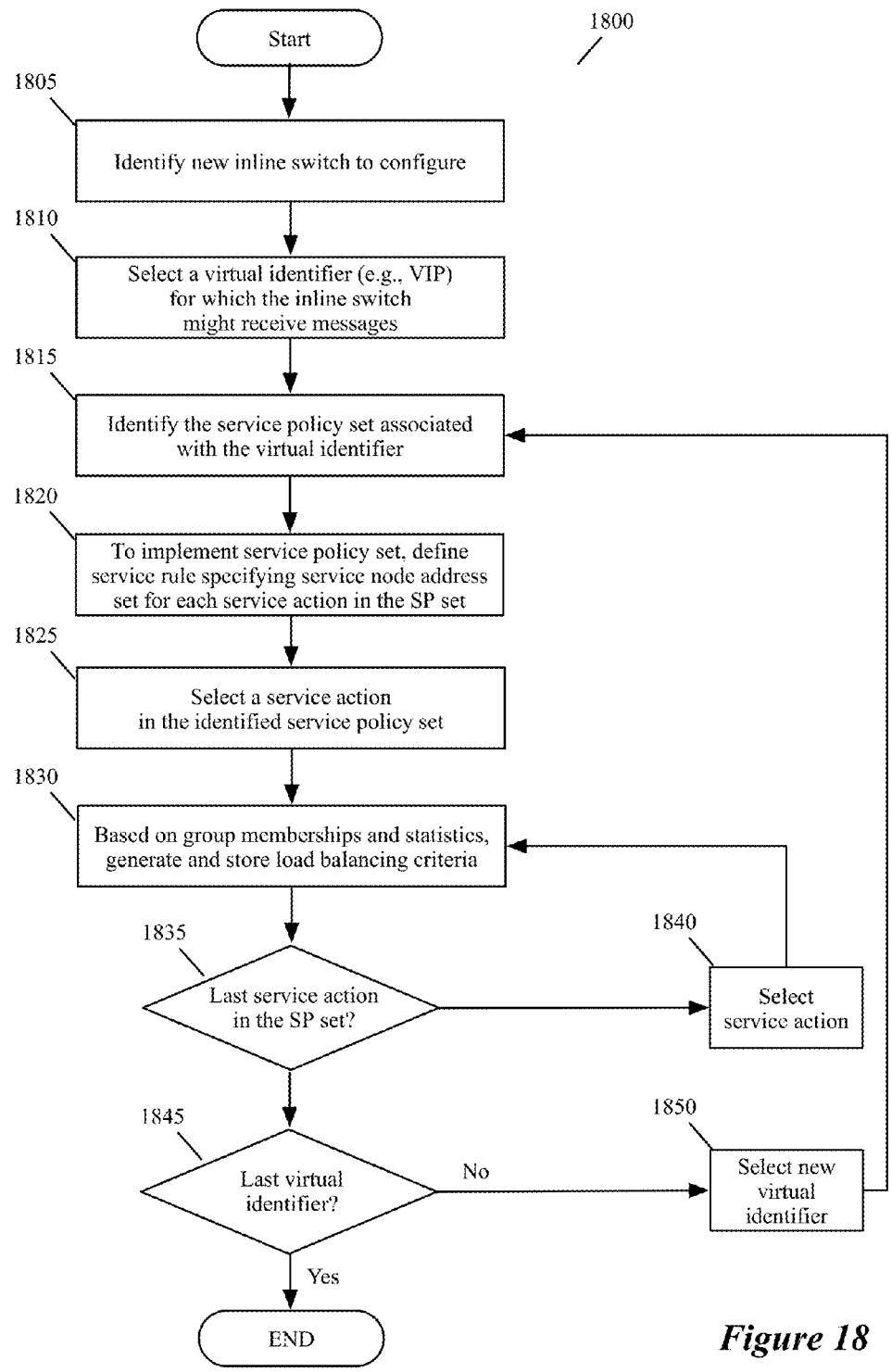
FIG. 18 conceptually illustrates a process of some embodiments for defining service policy rules for an inline switch.

FIG. 18 illustrates a process 1800 that a controller 1620 performs to define the service policy rules for an inline switch of a VM that is being provisioned on a host. As shown, the process 1800 initially identifies (at 1805) a new inline switch to configure. Next, at 1810, the process selects a virtual identifier (e.g., a VIP, a virtual address, etc.) that may be used to identify DCN groups or security policies/rules in packet flows that the inline switch may receive.

At 1815, the process 1800 identifies a service policy set that is associated with the selected virtual identifier. A service policy set specifies one or more service actions that need to be performed for packet flows that are associated with the selected virtual identifier. The process then defines (at 1820) a service rule for the identified service policy set. For each service action in the service policy set, the service rule specifies a set of service nodes or service-node clusters that performs the service action.

At 1825, the process then selects a service action in the identified service policy set. Next, at 1830, the process generates and stores in the defined rule (i.e., the rule defined at 1820) load balancing criteria for the set of service nodes or service-node clusters that perform the selected service action. The process generates the load balancing criteria based on the membership of the set of service nodes or service-node clusters, and statistics regarding the packet flow load on the service-node or service-cluster set that the controller collects from the inline switches.

At 1835, the process determines whether it has examined all the service actions in the identified service policy set. If not, the process selects (at 1840) another service action in the identified service policy set, and then transitions back to 1830 to generate and store load balancing criteria for the set of service nodes or service-node clusters that perform the selected service action. When the process determines that it has examined all the service actions in the identified service policy set, the process determines (at 1845) whether it has processed all virtual identifiers that may be used to identify DCN groups or security policies/rules in packet flows that the inline switch may receive.

If not, the process selects (at 1850) another virtual identifier that may be used to identify DCN groups or security policies/rules in packet flows that the inline switch may receive. After 1850, the process returns to 1815 to repeat operations 1815-1850 for the selected virtual identifier. When the process determines (at 1845) that it has examined all virtual identifiers for the inline switch, it ends.

In process 1800, a service policy set is associated with a virtual identifier that may be used in a packet flow that an inline switch may receive. In other embodiments, the controller can define a services rule for a service policy set that is associated with a set of two or more virtual identifiers (e.g., a VIP and a L7 tag), or with a virtual identifier and one or more other packet header values (e.g., source IP address, source port address, etc.). More generally, the controller in some embodiments can define a service rule that defines one or more service actions to implement a service policy set and can associate this service rule with any arbitrary combination of physical and/or virtual packet header values.

In this manner, a controller in some embodiments can seamlessly reconfigure the application or service layer deployment in the datacenter without having to configure the SCNs to use new DCN group addresses (e.g., new VIPs). The controller only needs to provide the inline switches with new distribution rules that dictate new traffic distribution patterns based on previously configured DCN group addresses and/or based on any arbitrary packet header parameters (e.g., L2, L3, L4 or L7 parameters) that are used by the SCNs.

Figure 19:
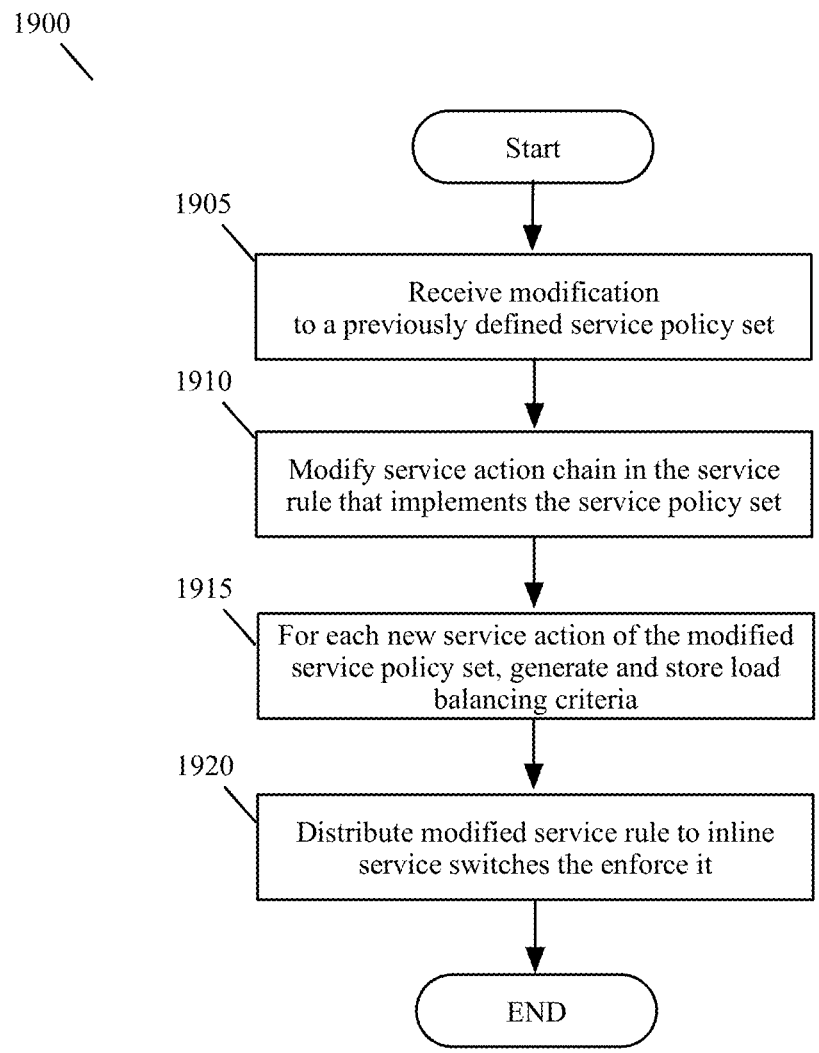
FIG. 19 conceptually illustrates a process of some embodiments for modifying a service rule and reconfiguring inline service switches that implement this service rule.

FIG. 19 illustrates a process 1900 for modifying a service rule and reconfiguring inline service switches that implement this service rule. This process is performed by each controller in a set of one or more controllers in some embodiments. As shown, the process 1900 starts (at 1905) when it receives a modification to a service policy set for which the controller set has previously generated a service rule and distributed this service rule to a set of one or more inline switches that implements the service policy set. The received modification may involve the removal of one or more service actions from the service policy set or the addition of one or more service actions to the service policy set. Alternatively or conjunctively, the received modification may involve the reordering of one or more service actions in the service policy set.

Next, at 1910, the process 1900 changes the service action chain in the service rule to account for the received modification. This change may insert one or more service actions in the rule's action chain, may remove one or more service actions from the rule's action chain, or may reorder one or more service actions in the rule's action chain. In some embodiments, a service rule specifies a service action chain by specifying (1) two or more service action types and (2) for each service action type, specifying a set of IP addresses that identify a set of service nodes or service-node clusters that perform the service action type. Each service rule in some embodiments also specifies a set of load balancing criteria for each action type's set of IP addresses.

For each new service action in the service action chain, the process 1900 then defines (at 1915) the set of load balancing criteria (e.g., a set of weight values for a weighted, round-robin load balancing scheme). In some embodiments, the process generates the load balancing criteria set based on (1) the membership of the set of service nodes or service-node clusters that perform the service action, and (2) statistics regarding the packet flow load on the service-node or service-cluster set that the controller collects from the inline switches.

Lastly, at 1920, the process distributes the modified service rule to the hosts that execute the inline service switches that process the service rule. These are the inline service switches that may encounter packets associated with the modified service rule. After 1920, the process ends.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 20:
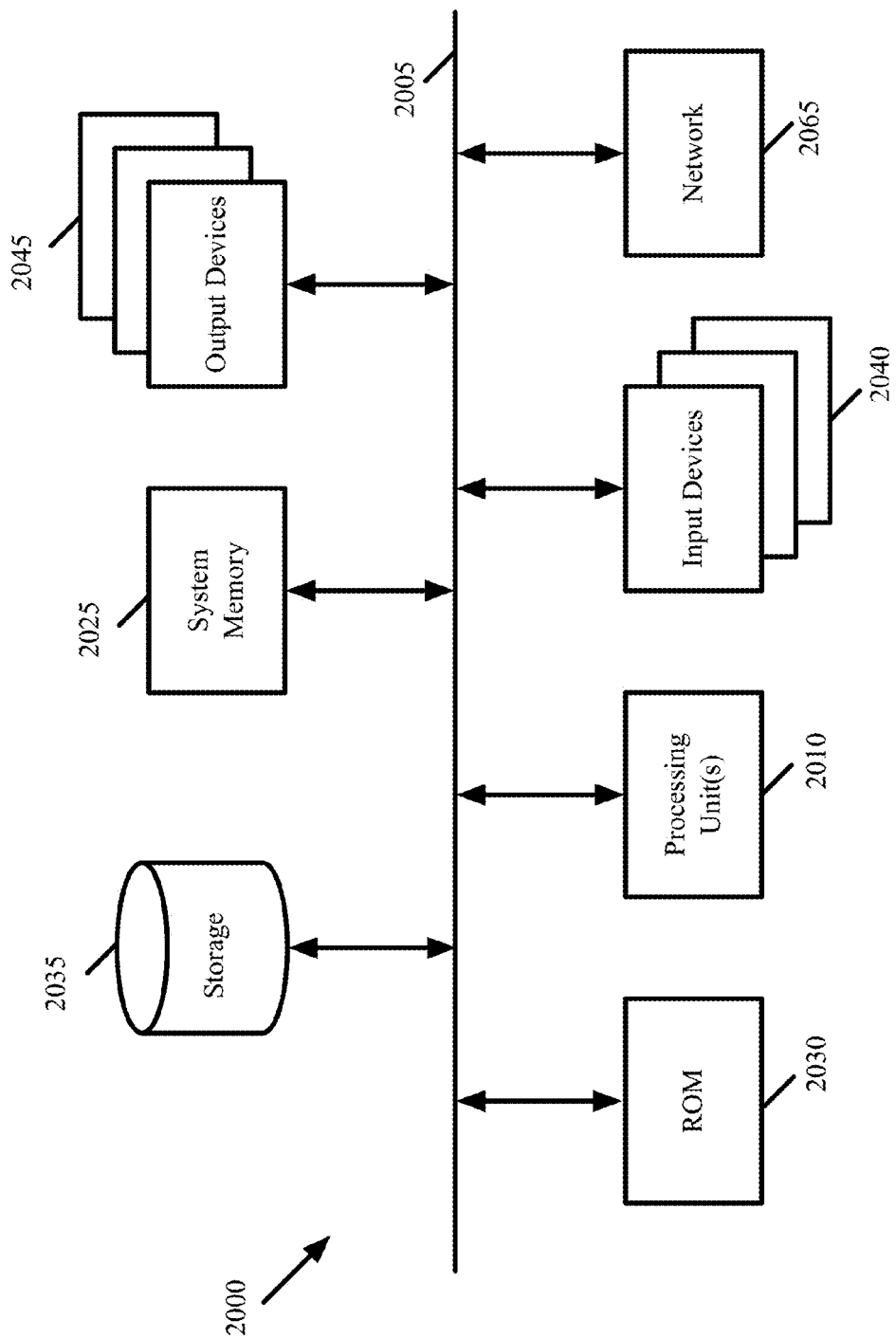
FIG. 20 conceptually illustrates an electronic system with which some embodiments of the invention are implemented.

FIG. 20 conceptually illustrates an electronic system 2000 with which some embodiments of the invention are implemented. The electronic system 2000 can be used to execute any of the control, virtualization, or operating system applications described above. The electronic system 2000 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2000 includes a bus 2005, processing unit(s) 2010, a system memory 2025, a read-only memory 2030, a permanent storage device 2035, input devices 2040, and output devices 2045.

The bus 2005 collectively represents all system, peripheral, and chipset buses that communicatively connect the numerous internal devices of the electronic system 2000. For instance, the bus 2005 communicatively connects the processing unit(s) 2010 with the read-only memory 2030, the system memory 2025, and the permanent storage device 2035.

From these various memory units, the processing unit(s) 2010 retrieves instructions to execute and data to process in order to execute the processes of the invention. The processing unit(s) may be a single processor or a multi-core processor in different embodiments.

The read-only-memory (ROM) 2030 stores static data and instructions that are needed by the processing unit(s) 2010 and other modules of the electronic system. The permanent storage device 2035, on the other hand, is a read-and-write memory device. This device is a non-volatile memory unit that stores instructions and data even when the electronic system 2000 is off. Some embodiments of the invention use a mass-storage device (such as a magnetic or optical disk and its corresponding disk drive) as the permanent storage device 2035.

Other embodiments use a removable storage device (such as a floppy disk, flash drive, etc.) as the permanent storage device. Like the permanent storage device 2035, the system memory 2025 is a read-and-write memory device. However, unlike storage device 2035, the system memory is a volatile read-and-write memory, such a random access memory. The system memory stores some of the instructions and data that the processor needs at runtime. In some embodiments, the invention's processes are stored in the system memory 2025, the permanent storage device 2035, and/or the read-only memory 2030. From these various memory units, the processing unit(s) 2010 retrieves instructions to execute and data to process in order to execute the processes of some embodiments.

The bus 2005 also connects to the input and output devices 2040 and 2045. The input devices enable the user to communicate information and select commands to the electronic system. The input devices 2040 include alphanumeric keyboards and pointing devices (also called "cursor control devices"). The output devices 2045 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 20, bus 2005 also couples electronic system 2000 to a network 2065 through a network adapter (not shown). In this manner, the computer can be a part of a network of computers (such as a local area network ("LAN"), a wide area network ("WAN"), or an Intranet, or a network of networks, such as the Internet. Any or all components of electronic system 2000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, in several embodiments described above, the inline switches intercept the data messages along the egress datapath of the SCNs. In other embodiments, however, the inline switches intercept the data messages along the ingress datapath of the SCNs.

In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A method of implementing a service model in a datacenter comprising a plurality of host computers executing a plurality of source compute nodes (SCNs), the method comprising:
providing a particular host computer with parameters for establishing first and second tunnels between the particular host computer and first and second service nodes of first and second service providers external to the datacenter; and
providing the particular host computer with a service-action set that includes first and second service actions to be respectively performed by the first and second service nodes on at least one data message flow of one SCN executing on the particular host computer,
each service action in the service-action set defined by referencing an identifier that identifies one service provider for performing the service action,
each tunnel for use in relaying each data message of said data message flow to a service node of a service provider to perform a service action on the data message,
wherein after performing the first service action on each data message of said data message flow, the first service node of the first service provider sends a response data message back to the particular host computer along the first tunnel and the data message is sent to the second service node of the second service provider along the second tunnel for the second service node to perform the second service action on the data message.

2. The method of claim 1, wherein the provided service-action set is provided with a flow identifier that identifies the data message flow to which the first and second service actions of the provided service-action set have to be applied.

3. The method of claim 2, wherein providing the service-action set comprises providing a service-action rule that comprises the service-action set and the flow identifier of the data message flow.

4. The method of claim 2, wherein providing the service-action set comprises providing a service-action policy from which the particular host computer generates a service-action rule, said service-action rule comprising the service-action set and the flow identifier of the data message flow.

5. The method of claim 2, wherein the service-action set's provided flow identifier is for use by a service-processing module that executes on the particular host computer and that compares header values of SCN-associated data message flows with the flow identifier in order to identify data message flows on which the service-action set has to be performed.

6. The method of claim 5, wherein the service-processing module is a filter deployed on an egress datapath of the SCN in order to intercept and examine data messages that the SCN transmits.

7. The method of claim 5, wherein the service-processing module is a filter deployed on an ingress datapath of the SCN in order to intercept and examine data messages that are received for SCN before these messages are supplied to the SCN.

8. The method of claim 1, wherein the provided tunnel-establishing parameters comprise tunnel header packet parameters.

9. The method of claim 8, wherein the provided tunnel-establishing parameters further comprise tunnel keys for allowing multiple different data message flows to use one tunnel from the particular host computer to a particular service provider.

10. The method of claim 8, wherein the provided tunnel-establishing parameters further comprise parameters for generating tunnel keys for allowing multiple different data message flows to use one tunnel from the particular host computer to a particular service provider.

11. The method of claim 1, wherein the service-provider identifier identifies the service provider by identifying a tunnel to a service node of the service provider.

12. The method of claim 1, wherein
providing the tunnel-establishing parameters comprises providing parameters to establish a plurality of tunnels to a plurality of service nodes of a first service provider, and
providing the service-action set comprises providing a service-action identifier that identifies the first service provider for a service action through a plurality of tunnel identifiers that identify the plurality of tunnels to the plurality of service nodes of the first service provider.

13. The method of claim 1, wherein
providing the tunnel-establishing parameters comprises providing parameters to establish a plurality of tunnels to a plurality of service nodes of the first service provider (SP),
the method further comprising providing a set of load balancing criteria for selecting tunnels in the plurality of first SP tunnels for data message flows distributed to the first SP, said selection of tunnels distributing data message flows among the plurality of service nodes of the first SP in a load balanced way based on the load balancing criteria set.

14. The method of claim 1, wherein
providing the tunnel-establishing parameters comprises providing parameters to establish at least two tunnels to two service nodes of two service providers that perform the same service action,
the method further comprising providing a set of selection criteria for selecting one of the two provided tunnels to the first and second service providers for a data message flow.

15. The method of claim 14, wherein the selection criteria set comprises dynamically assessed criteria.

16. The method of claim 1, wherein different service providers are different service vendors that operate in different datacenters that connect to the datacenter of the particular host computer through a public network.

17. The method of claim 1, wherein
the data message sent to the first service node is a first data message and the response data message is a second data message, and
the response second data message is a modified version of the first data message, said modification accounting for the processing of the first data message by the first service node.

18. A non-transitory machine readable medium storing a program for implementing a service model in a datacenter comprising a plurality of host computers executing a plurality of source computer nodes (SCNs), the program comprising sets of instructions for:
providing a particular host computer with parameters for establishing first and second tunnels between the particular host computer and first and second service nodes of first and second service providers external to the datacenter; and
providing the particular host computer with a service-action set that includes first and second service actions to be respectively performed by the first and second service nodes on at least one data message flow of one SCN executing on the particular host computer,
each service action in the service-action set defined by referencing an identifier that identifies one service provider for performing the service action,
each tunnel for use in relaying each data message of said data message flow to a service node of a service provider to perform a service action on the data message,
wherein after performing the first service action on each data message of said data message flow, the first service node of the first service provider sends a response data message back to the particular host computer along the first tunnel and the data message is sent to the second service node of the second service provider along the second tunnel for the second service node to perform the second service action on the data message.

19. The machine readable medium of claim 18, wherein
the provided service-action set is provided with a flow identifier that identifies the data message flow to which the first and second service actions of the provided service-action set have to be applied,
the set of instructions for providing the service-action set comprises a set of instructions for providing a service-action policy from which the particular host computer generates a service-action rule, said service-action rule comprising the service-action set and the flow identifier of the data message flow.

20. The machine readable medium of claim 19, wherein the service-action set's provided flow identifier is for use by a service-processing module that executes on the particular host computer and that compares header values of SCN-associated data message flows with the flow identifier in order to identify data message flows on which the service-action set has to be performed.

21. The machine readable medium of claim 18, wherein
the provided tunnel-establishing parameters comprise tunnel header packet parameters and tunnel keys for allowing multiple different data message flows to use one tunnel from the particular host computer to a particular service provider.

22. The machine readable medium of claim 18, wherein the service-action identifier identifies the service provider by identifying one or more tunnels, each tunnel from the particular host computer to a service node of the service provider.

23. The machine readable medium of claim 18, wherein
the set of instructions for providing the tunnel-establishing parameters comprises a set of instructions providing parameters to establish a plurality of tunnels to a plurality of service nodes of the first service provider (SP),
the program further comprising a set of instructions for providing a set of load balancing criteria for selecting tunnels in the plurality of first SP tunnels for the data message flows distributed to the first SP, said selection of tunnels distributing data message flows among the plurality of service nodes of the first SP in a load balanced way based on the load balancing criteria set.

* * * * *